United States Patent
Yamabe et al.

(10) Patent No.: US 9,892,721 B2
(45) Date of Patent: Feb. 13, 2018

(54) INFORMATION-PROCESSING DEVICE, INFORMATION PROCESSING METHOD, AND PROGRAM

(71) Applicant: Sony Corporation, Tokyo (JP)

(72) Inventors: Yushi Yamabe, Tokyo (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/321,408

(22) PCT Filed: May 14, 2015

(86) PCT No.: PCT/JP2015/063919
§ 371 (c)(1),
(2) Date: Dec. 22, 2016

(87) PCT Pub. No.: WO2016/002358
PCT Pub. Date: Jan. 7, 2016

(65) Prior Publication Data
US 2017/0200442 A1    Jul. 13, 2017

(30) Foreign Application Priority Data

Jun. 30, 2014  (JP) ................................. 2014-134909

(51) Int. Cl.
H04R 29/00 (2006.01)
G10K 11/178 (2006.01)
G10K 15/08 (2006.01)
H04R 3/04 (2006.01)

(52) U.S. Cl.
CPC ............ *G10K 11/178* (2013.01); *G10K 15/08* (2013.01); *H04R 3/04* (2013.01)

(58) Field of Classification Search
CPC ......... H04R 3/04; G10K 11/178; G10K 15/08
USPC .......................................................... 381/56
See application file for complete search history.

(56) References Cited

U.S. PATENT DOCUMENTS

| 2001/0016046 | A1 | 8/2001 | Ohta |
| 2011/0142247 | A1 | 6/2011 | Fellers et al. |
| 2012/0057715 | A1 | 3/2012 | Johnston et al. |
| 2013/0272527 | A1* | 10/2013 | Oomen .................. G10K 15/12 381/17 |

FOREIGN PATENT DOCUMENTS

| JP | 2001-224100 A | 8/2001 |
| JP | 2008-282042 A | 11/2008 |
| JP | 2011-530218 A | 12/2011 |
| JP | 2013-541275 A | 11/2013 |
| JP | 2014-505420 A | 2/2014 |

* cited by examiner

*Primary Examiner* — Paul S Kim
(74) *Attorney, Agent, or Firm* — Wolf, Greenfield & Sacks, P.C.

(57) ABSTRACT

[Object] To provide a feeling of more openness to the user. [Solution] Provided is an information processing device, including: a listening environment characteristic information acquiring unit configured to acquire listening environment characteristic information indicating a characteristic of a listening environment based on an external sound collected through at least one microphone; and a musical signal processing unit configured to perform filtering of a musical signal according to a filter characteristic based on the acquired listening environment characteristic information.

14 Claims, 21 Drawing Sheets

INFORMATION-PROCESSING DEVICE, INFORMATION PROCESSING METHOD, AND PROGRAM

TECHNICAL FIELD

The present disclosure relates to an information processing device, an information processing method, and a program.

BACKGROUND ART

Audio equipment such as a headphone or an earphone is equipped with a so-called noise canceling system for reducing external noise. For example, Patent Literature 1 discloses a headphone that has a noise cancellation function and a monitor function of outputting an audio signal of an external sound (a so-called monitor signal) to be superimposed on a musical signal and enables a user to listen to an external sound such as an in-vehicle announcement while obtaining a noise reduction effect for the musical signal.

CITATION LIST

Patent Literature

Patent Literature 1: JP 2009-21826A

SUMMARY OF INVENTION

Technical Problem

Here, in the technique disclosed in Patent Literature 1, it is possible to give a feeling of being in a place without wearing a headphone to a user by outputting an audio signal of an external sound to be superimposed on a musical signal. However, since the musical signal is reproduced based on an original sound, sound becomes a so-called dry sound specific to the headphone, the musical signal is not harmonious with the external sound, and the user's feeling of openness is likely to be reduced.

In light of the foregoing, it is necessary to give a feeling of more openness to the user by providing music that is harmonizes better with an external sound to the user. In this regard, the present disclosure proposes an information processing device, an information processing method, and a program, which are novel and improved and are capable of giving a feeling of more openness to the user.

Solution to Problem

According to the present disclosure, there is provided an information processing device, including: a listening environment characteristic information acquiring unit configured to acquire listening environment characteristic information indicating a characteristic of a listening environment based on an external sound collected through at least one microphone; and a musical signal processing unit configured to perform filtering of a musical signal according to a filter characteristic based on the acquired listening environment characteristic information.

According to the present disclosure, there is provided an information processing method, including: acquiring, by a processor, listening environment characteristic information indicating a characteristic of a listening environment based on an external sound collected through at least one microphone; and performing, by the processor, filtering of a musical signal according to a filter characteristic based on the acquired listening environment characteristic information.

According to the present disclosure, there is provided a program causing a processor of a computer to execute: a function of acquiring listening environment characteristic information indicating a characteristic of a listening environment based on an external sound collected through at least one microphone; and a function of performing filtering of a musical signal according to a filter characteristic based on the acquired listening environment characteristic information.

According to the present disclosure, listening space characteristic information indicating an acoustic characteristic of a listening space is acquired based on an external sound. Then, the acoustic characteristic of the listening space is applied to a musical signal based on the acquired listening space characteristic information. Thus, music with a feeling of more openness that is harmonizes better with the external sound can be provided to the user.

Advantageous Effects of Invention

As described above, according to the present disclosure, it is possible to provide a feeling of more openness to the user. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
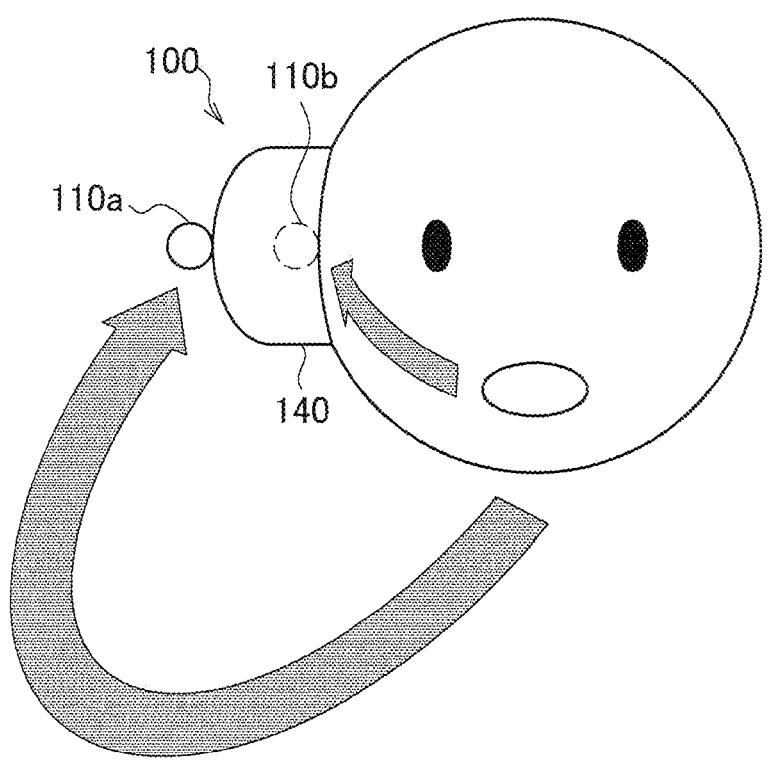
FIG. 1 is a schematic diagram illustrating an exemplary configuration of a headphone according to a first embodiment.

Hereinafter, preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. First embodiment
1-1. Overview of first embodiment
1-2. Configuration of system
1-3. Listening environment characteristic information acquiring unit
1-4. Musical signal processing unit
2. Second embodiment
2-1. Overview of second embodiment
2-2. Configuration of system
2-3. Listening environment characteristic information acquiring unit
2-3-1. Configuration of acquiring transfer function using musical signal as measurement signal
2-3-2. Configuration of acquiring correlation function using musical signal as measurement signal
2-3-3. Configuration of acquiring correlation function using uncorrelated noise as measurement signal
2-4. Musical signal processing unit
3. Information processing method
4. Modified examples
4-1. Modified example in which acoustic pressure is adjusted
4-2. Modified example in which listening environment characteristic information stored in DB is used
4-3. Modified example in which listening environment characteristic information is acquired by each of pair of housings
5. Hardware configuration
6. Conclusion 1. First Embodiment First, a first embodiment of the present disclosure will be described. In the first embodiment of the present disclosure, a sound related to an utterance by a user wearing a headphone (hereinafter, also referred to as a "spoken voice") is collected by a microphone as an external sound. Then, listening environment characteristic information indicating an acoustic characteristic of a space in which the user exists (hereinafter, also referred to as a "listening environment) is acquired based on the collected spoken voice. Further, an audio signal of musical content (hereinafter, also referred to as a "musical signal) is filtered according to a filter characteristic based on the acquired listening environment characteristic information. As a result, music in which the acoustic characteristic of the listening environment is reflected and which is more harmonious with the external sound is provided to the user.

(1-1. Overview of First Embodiment)

An overview of the first embodiment will be described with reference to FIG. 1 and an exemplary configuration of a headphone according to the first embodiment. FIG. 1 is a schematic diagram illustrating an exemplary configuration of the headphone according to the first embodiment.

Referring to FIG. 1, a headphone 100 according to the first embodiment includes a housing 140 worn on the ears of the user and a pair of microphones 110a and 110b installed on an outer side and an inner side of the housing 140. For the sake of simplicity, in the headphone 100, only the housing 140 worn on one ear of the user is illustrated in FIG. 1, but practically, the headphone 100 includes a pair of housings 140, and the other housing can be worn the other ear of the user. The headphone 100 may be, for example, a so-called overhead type headphone in which a pair of housings 140 are coupled to each other by a support member curved in an arch form. Alternatively, the headphone 100 may be a so-called inner ear type headphone in which a pair of housings 140 are coupled to each other by a wire or a support member. Similarly, although not illustrated, various kinds of components included in a common headphone such as a driver unit (speaker) that generates a sound by vibrating a vibrating plate according to the musical signal and a cable for supplying the musical signal to the driver unit may be mounted in the housing 140.

The microphone 110a installed on the outer side of the housing 140 is a microphone installed for a noise cancellation function based on a so-called feedforward scheme (hereinafter, also referred to as an "FF microphone 110a"). An audio signal for canceling a sound that may function as noise (hereinafter, also referred to as a "noise cancellation signal") may be generated based on the external sound collected through the FF microphone 110a. The musical signal on which the noise cancellation signal is superimposed is output from the speaker, and thus music in which noise is reduced is provided to the user.

The external sound collected through the FF microphone 110a may be used for a so-called monitor function of taking in the external sound and outputting it through the speaker. An audio signal that allows the user to listen to the external sound (hereinafter, also referred to as a "monitor signal") may be generated based on the external sound collected through the FF microphone 110a. The musical signal on which the monitor signal is superimposed is output from the speaker, and the external sound is provided to the user together with the music.

Here, in this specification, for the sake of simplicity and convenience, an output of a sound from the speaker according to an audio signal is assumed to also be expressed by an output of an audio signal. For the microphones 110a and 110b, similarly, for the sake of convenience, collection of a sound by the microphones 110a and 110b according to an audio signal is assumed to also be expressed by collection of an audio signal. A signal obtained by collecting a sound through the microphones 110a and 110b is also referred to as a "collection signal."

On the other hand, the microphone 110b installed on the inner side of the housing 140 is a microphone installed for a noise cancellation function based on a so-called feedback scheme (hereinafter, also referred to as an "FB microphone 110b"). The external sound that leaks into the inner side of the housing 140 is collected through the FB microphone 110b, and the noise cancellation signal may be generated based on the collected external sound.

Here, the headphone 100 can function as an input/output device that inputs and outputs various kinds of information from/to an information processing device such as a smart phone. For example, the user can input various kinds of instructions to the information processing device by voice in a state in which the headphone 100 is worn. Further, when the information processing device has a telephone function, the headphone 100 may undertake a so-called headset function, and the user may make a phone call through the headphone 100.

In the first embodiment, for example, using the headphone 100 having the configuration illustrated in FIG. 1, a transfer function $H_2$ of the listening environment of the user is calculated as the listening environment characteristic information based on the spoken voice of the user such as the instruction or the phone call. Specifically, the transfer function $H_2$ until the spoken voice of the user wearing the headphone 100 arrives at the FF microphone 110a is one in which the acoustic characteristic of the listening environment is reflected. On the other hand, a transfer function $H_1$ until the spoken voice arrives at the FB microphone 110b is a transfer function when a sound is transferred through the body of the user such as flesh conduction or bone conduction, that is, one which does not reflect the acoustic characteristic of the listening environment. In the first embodiment, the transfer function $H_2$ of the listening environment may be calculated as the listening environment characteristic information based on the spoken voice of the user collected through the FF microphone 110a and the FB microphone 110b. The musical signal is filtered based on the calculated transfer function $H_2$, and thus music in which the acoustic characteristic of the external environment is considered and which is more harmonious with the external sound is provided to the user, and a feeling of more openness can be given to the user.

In the following description, first, an exemplary configuration of an acoustic adjustment system for implementing the above-described processes according to the first embodiment will be described in (1-2. Configuration of system). Then, a method of acquiring the listening environment characteristic information according to the first embodiment will be described in detail in (1-3. Listening environment characteristic information acquiring unit). Further, filtering of the musical signal based on the acquired listening environment characteristic information will be described in detail in (1-4. Musical signal processing unit).

(1-2. Configuration of System)

Figure 2:
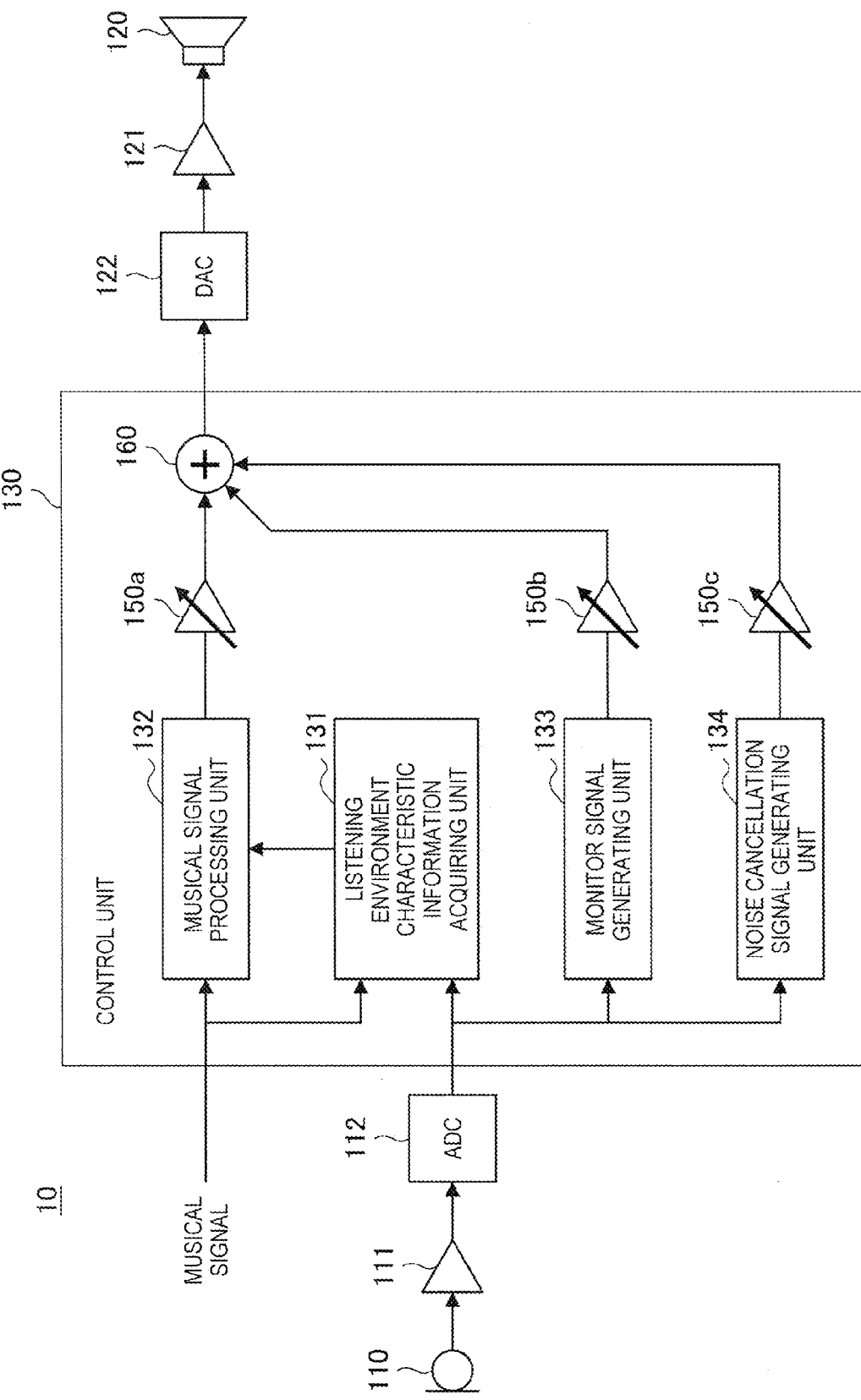
FIG. 2 is a block diagram illustrating an exemplary configuration of an acoustic adjustment system according to the first embodiment.

A configuration of the acoustic adjustment system according to the first embodiment will be described with reference to FIG. 2. FIG. 2 is a block diagram illustrating an exemplary configuration of the acoustic adjustment system according to the first embodiment.

Referring to FIG. 2, an acoustic adjustment system 10 according to the first embodiment includes a microphone 110, a speaker 120, and a control unit 130.

The microphone 110 collects a sound, converts the sound into an electrical signal, and acquires a signal corresponding to the sound (that is, the collection signal). The microphone 110 corresponds to the microphones 110a and 110b illustrated in FIG. 1 and schematically indicates the microphones 110a and 110b together. In the first embodiment, the microphone 110 collects the external sound used for the noise cancellation function and the monitor function. The microphone 110 collects the spoken voice of the user used for acquiring the listening environment characteristic information. The collection signal obtained by the microphone 110 is appropriately amplified by the amplifier 111, is converted into a digital signal by an analog-to-digital converter (ADC) 112, and is then input to a listening environment characteristic information acquiring unit 131, a monitor signal generating unit 133, and a noise cancellation signal generating unit 134 of the control unit 130 which will be described later. Practically, the amplifier 111 and the ADC 112 are installed for each of the microphones 110a and 110b.

The speaker 120 vibrates the vibrating plate according to the audio signal and outputs a sound according to the audio signal. The speaker 120 corresponds to the driver unit mounted in the headphone 100 illustrated in FIG. 1. In the first embodiment, the musical signal filtered based on the listening environment characteristic information (that is, the transfer function $H_2$ of the listening environment) may be output from the speaker 120. The noise cancellation signal and/or the monitor signal may be superimposed on the musical signal output from the speaker 120. An audio signal that is converted into an analog signal by a digital-to-analog converter (DAC) 122 and then appropriately amplified by an amplifier 121 is output from the speaker 120.

The control unit (corresponding to the information processing device of the present disclosure) 130 is configured with various kinds of processors such as a central processing unit (CPU) or a digital signal processor (DSP), and executes various kinds of signal processing performed in the acoustic adjustment system 10. The control unit 130 has functions such as the listening environment characteristic information acquiring unit 131, a musical signal processing unit 132, the monitor signal generating unit 133, and the noise cancellation signal generating unit 134. The functions of the control unit 130 can be implemented as the processor constituting the control unit 130 operates according to a predetermined program. The processor constituting the control unit 130 may be mounted in the headphone 100 illustrated in FIG. 1 or may be mounted in an information processing device (for example, a mobile terminal such as a smart phone carried by the user) separate from the headphone 100 illustrated in FIG. 1. Alternatively, the functions of the control unit 130 may be implemented by a processor of an information processing device such as a server installed on a network (on a so-called cloud). When the processor constituting the control unit 130 is mounted in a mobile terminal or a server which is separated from the headphone 100, the headphone 100 in which at least the speaker 120 and the microphone 110 are mounted is worn by the user, and the headphone 100 performs transmission and reception of various kinds of information with the mobile terminal or the server, and thus various kinds of processes can be performed in the acoustic adjustment system 10.

The control unit 130 is connected so as to be able to perform communication with an external device, and the musical signal is input from the external device to the listening environment characteristic information acquiring unit 131 and the musical signal processing unit 132 of the control unit 130. For example, the external device may be a reproduction device capable of reproducing musical content such as a Compact Disc (CD) player, a Digital Versatile Disc (DVD) player, or a Blu-ray (registered trademark) player. The external device can read the musical signal recorded according to various kinds of recording schemes from various kinds of recording media. The mobile terminal may have the function of the external device (the reproduction device).

The listening environment characteristic information acquiring unit 131 acquires the listening environment characteristic information indicating the acoustic characteristic of the listening environment based on the external sound collected through the microphone 110. In the first embodiment, the listening environment characteristic information acquiring unit 131 acquires the transfer function $H_2$ of the listening environment as the listening environment characteristic information based on the spoken voice of the user collected through the microphone 110. The listening environment characteristic information acquiring unit 131 provides information about the acquired transfer function $H_2$ to the musical signal processing unit 132. The function of the listening environment characteristic information acquiring unit 131 will be described in detail in (1-3. Listening environment characteristic information acquiring unit).

Here, a timing at which the listening environment characteristic information acquiring unit 131 starts to acquire the listening environment characteristic information may be a timing at which a predetermined condition (hereinafter, also referred to as a "listening environment characteristic information acquisition condition") such as power supply or a specified timer count (that is, a predetermined timing) is detected. In the first embodiment, since the listening environment characteristic information is acquired based on the spoken voice of the user, the listening environment characteristic information acquiring unit 131 may start to acquire the listening environment characteristic information at a timing at which the voice of the user is detected. Further, when the processor constituting the control unit 130 is mounted in a mobile terminal separate from the headphone 100, the listening environment characteristic information acquisition condition may include information indicating that movement of the user is detected by a sensor such as a Global Positioning System (GPS) sensor mounted in the mobile terminal or information indicating that an operation input on the mobile terminal is detected.

The musical signal processing unit 132 performs predetermined signal processing on the musical signal based on the listening environment characteristic information acquired by the listening environment characteristic information acquiring unit 131. In the first embodiment, the musical signal processing unit 132 performs filtering of the musical signal based on the transfer function $H_2$ acquired by the listening environment characteristic information acquiring unit 131. Specifically, the musical signal processing unit 132 can apply, for example, a reverberation characteristic according to an external environment (an early reflection period of time, a reverberation period of time, or the like) to the musical signal by performing filtering of the musical signal through a filter having a filter characteristic in which a characteristic of the transfer function $H_2$ of the listening space is reflected. The musical signal that has undergone signal processing by the musical signal processing unit 132 (hereinafter, also referred to as a "post-signal processing musical signal") appropriately undergoes gain adjustment by a variable amplifier 150a and is then output from the speaker 120 via the DAC 122 and the amplifier 121. The post-signal processing musical signal may be added to the noise cancellation signal and/or the monitor signal through an adder 160 and then output to the speaker 120 in this state as illustrated in FIG. 2. The function of the musical signal processing unit 132 will be described in detail in (1-4. Musical signal processing unit).

The monitor signal generating unit 133 generates the monitor signal serving as the audio signal that allows the user to listen to the external sound based on the external sound collected by the microphone 110. The monitor signal generating unit 133 can adjust a sound related to the monitor signal (hereinafter, also referred to as a "monitor sound") so that the external sound is combined with a sound directly leaking into the housing and becomes a natural sound. The monitor signal generating unit 133 is, for example, configured with a high-pass filter (HPF) and a gain circuit, and the collection signal obtained by the microphone 110 is input to the HPF via the amplifier 111 and the ADC 112. Here, a cutoff frequency of the HPF may be set to remove a low-frequency component including many noise components that are unpleasant to hear. Thus, the monitor signal in which the low-frequency noise components that are unpleasant to hear are removed and the external sound such as the in-vehicle announcement is adjusted to be easily heard can be generated. The monitor signal generated by the monitor signal generating unit 133 can appropriately undergo a gain adjustment by a variable amplifier 150b, and then be added to the post-signal processing musical signal by the adder 160 and output from the speaker 120. Since the monitor signal is superimposed, the user can listen to, for example, the external sound such as the in-vehicle announcement together with music when the headphone 100 is worn.

The noise cancellation signal generating unit 134 generates the noise cancellation signal serving as the audio signal for cancelling the noise component included in the external sound based on the external sound collected by the microphone 110. For example, the noise cancellation signal generating unit 134 is configured with an inverter that generates a signal having a reverse phase to an external audio signal and a filter circuit that adjusts a cancellation band. For example, a signal characteristic a corresponding to the noise canceling system based on the FF scheme is set in the noise cancellation signal generating unit 134, and the noise cancellation signal generating unit 134 is configured to apply the signal characteristic a to the collection signal obtained by the FF microphone 110a of the microphone 110. The signal characteristic a indicates a signal characteristic to be applied to the collection signal in view of circuits or a spatial transfer function of the noise canceling system based on the FF scheme (for example, a frequency-amplitude characteristic or a frequency-phase characteristic) so that the noise cancellation signal from which external sound is canceled and which the user listens to is generated. The filter circuit of the noise cancellation signal generating unit 134 may be configured to apply, for example, the signal characteristic a to the collection signal. The noise cancellation signal generated by the noise cancellation signal generating unit 134 can appropriately undergo a gain adjustment by a variable amplifier 150c, and then be added to the post-signal processing musical signal by the adder 160 and output from the speaker 120. Since the noise cancellation signal is superimposed and the noise is reduced, the user can listen to the music with better acoustic quality.

The noise cancellation signal generating unit 134 may generate the noise cancellation signal corresponding to the noise canceling system based on the FB scheme. In this case, the noise cancellation signal generating unit 134 may be configured to generate the noise cancellation signal by applying a predetermined signal characteristic to the collection signal obtained by the FB microphone 110b of the microphone 110.

Here, various kinds of known functions that are commonly performed to generate the monitor signal and the noise cancellation signal may be applied as the monitor signal generating unit 133 and the noise cancellation signal generating unit 134. Thus, a detailed description of specific configurations of the monitor signal generating unit 133 and the noise cancellation signal generating unit 134 will be omitted. As an example of the functions of the monitor signal generating unit 133 and the noise cancellation signal generating unit 134, for example, the technique disclosed in Patent Literature 1 previously filed by the present applicant can be referred to.

In the first embodiment, the generation of the monitor signal by the monitor signal generating unit 133 and the generation of the noise cancellation signal by the noise cancellation signal generating unit 134 need not be necessarily performed. Even when the monitor signal and the noise cancellation signal are not superimposed, the musical signal that has undergone the signal processing based on the listening environment characteristic information by the musical signal processing unit 132 is output to the user, and thus music having a feeling of more openness in which the external environment is considered can be provided to the user.

The configuration of the acoustic adjustment system 10 according to the first embodiment has been described above. In the above-described acoustic adjustment system 10, various kinds of signal processing, particularly, the processes in the control unit 130, may be performed by, for example, one processor or one information processing device or may be performed by collaboration of a plurality of processors or a plurality of information processing devices. Alternatively, as described above, such signal processing may be performed by an information processing device such as a server installed on a network (on a so-called cloud) or a group of information processing devices.

The device configuration that can be implemented in the acoustic adjustment system 10 according to the first embodiment is not limited to the configuration illustrated in FIG. 1 and may be arbitrary. For example, the acoustic adjustment system 10 illustrated in FIG. 1 may be configured as an integrated device. The external device (the reproduction device) that provides the musical signal to the control unit 130 may be included in the device. When the configuration of the acoustic adjustment system 10 and the reproduction device are configured as an integrated device, the device may be, for example, a headphone type portable music player.

(1-3. Listening Environment Characteristic Information Acquiring Unit)

Figure 3:
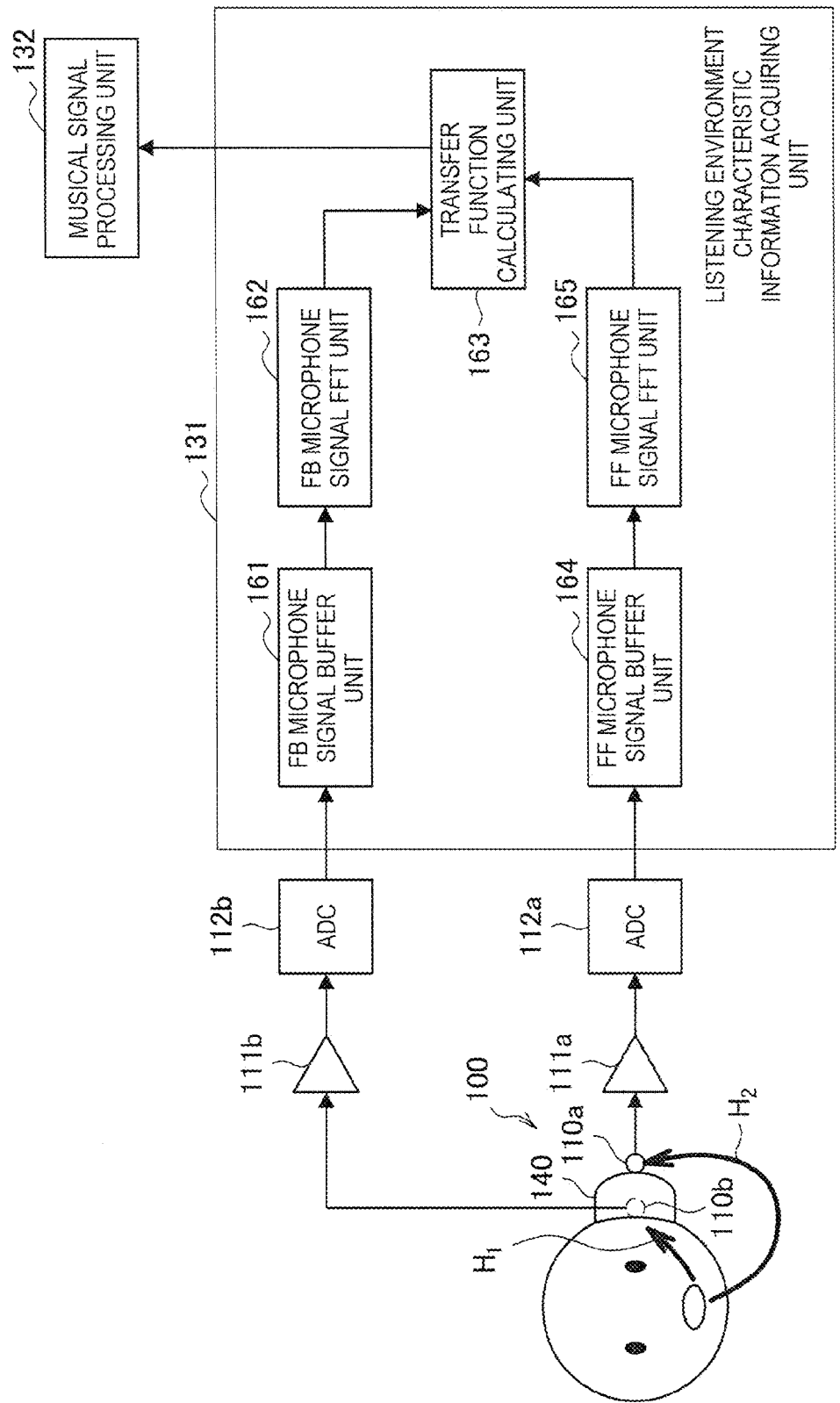
FIG. 3 is a block diagram illustrating an example of a functional configuration of a listening environment characteristic information acquiring unit.

A function of the listening environment characteristic information acquiring unit 131 illustrated in FIG. 2 will be described with reference to FIG. 3. FIG. 3 is a block diagram illustrating an example of a functional configuration of the listening environment characteristic information acquiring unit 131.

Referring to FIG. 3, the listening environment characteristic information acquiring unit 131 has functions such as an FB microphone signal buffer unit 161, an FB microphone signal FFT unit 162, a transfer function calculating unit 163, an FF microphone signal buffer unit 164, and an FF microphone signal FFT unit 165. In FIG. 3, a functional configuration of the listening environment characteristic information acquiring unit 131 is illustrated, and it is illustrated together with an extracted configuration related to the functions of the listening environment characteristic information acquiring unit 131 in the configuration of the acoustic adjustment system 10 illustrated in FIG. 2.

In FIG. 3, for example, when various kinds of instructions are given to the information processing device or when a phone call is made, a parameter indicating a voice (a spoken voice) coming from the mouth of the user is indicated by S. Further, a transfer function until the spoken voice arrives at the FB microphone 110b from the mouth of the user is indicated by $H_1$, and a transfer function until the spoken voice arrives at the FF microphone 110a from the mouth of the user is assumed to be $H_2$. The transfer function $H_1$ indicates a transfer function until the spoken voice arrives at the FB microphone 110a via the body of the user such as flesh conduction or bone conduction. On the other hand, the transfer function $H_2$ indicates a transfer function until the spoken voice arrives at the FF microphone 110a via a space in which the user speaks (the listening environment).

The transfer function $H_1$ indicates a transfer characteristic of a sound in a state which does not include an acoustic characteristic of the listening environment (for example, the reverberation characteristic, a reflection characteristic by a wall surface or the like, or the like), and the transfer function $H_2$ indicates a transfer characteristic of a sound in which the acoustic characteristic of the external listening environment is reflected. Thus, the transfer function $H_1$ is a known value that does not vary according to the listening environment and can be acquired in advance, for example, by measurement in an anechoic room or the like when the headphone 100 is designed. On the other hand, the transfer function $H_2$ is an unknown value that varies according to the listening environment. The listening environment characteristic information acquiring unit 131 can acquire the transfer function $H_2$ of the listening space as the listening environment characteristic information based on the spoken voice of the user collected by the FF microphone 110a and the FB microphone 110b.

As illustrated in FIG. 3, the collection signal obtained by the FB microphone 110b is appropriately amplified by the amplifier 111b, converted into the digital signal by the ADC 112b, and then input to the FB microphone signal buffer unit 161 of the listening environment characteristic information acquiring unit 131. The FB microphone signal buffer unit 161 buffers the collection signal obtained by the FB microphone 110b with a predetermined frame length, and provides the collection signal to the FB microphone signal FFT unit 162 at a subsequent stage. The FB microphone signal FFT unit 162 performs a fast Fourier transform (FFT) on the collection signal, and provides a resulting signal to the transfer function calculating unit 163 at a subsequent stage. The collection signal that is collected by the FB microphone 110b and then input to the transfer function calculating unit 163 via the FB microphone signal buffer unit 161 and the FB microphone signal FFT unit 162 may be indicated by "$S*H_1$" using the parameter S and the transfer function $H_1$.

Similarly, the collection signal obtained by the FF microphone 110a is appropriately amplified by the amplifier 111a, converted into the digital signal by the ADC 112a, and then input to the FF microphone signal buffer unit 164 of the listening environment characteristic information acquiring unit 131. The FF microphone signal buffer unit 164 buffers the collection signal obtained by the FF microphone 110a with a predetermined frame length, and provides the collection signal to the FF microphone signal FFT unit 165 at a subsequent stage. The FF microphone signal FFT unit 165 performs the FFT on the collection signal, and provides a resulting signal to the transfer function calculating unit 163 at a subsequent stage. The collection signal that is collected by the FF microphone 110a and input to the transfer function calculating unit 163 via the FF microphone signal buffer unit 164 and the FF microphone signal FFT unit 165 may be indicated by "S*H$_2$" using the parameter S and the transfer function H$_2$.

Here, the signal S*H$_1$ and the signal S*H$_2$ may be known values acquired as the measurement signal as described above. As described above, the transfer function H$_1$ may be a known value obtained by prior measurement. Thus, the transfer function calculating unit 163 can calculates the transfer function H$_2$ of the listening space based on the following Formula (1).

[Math. 1]

$$H_2 = \frac{SH_2 * H_1}{SH_1} \quad (1)$$

The transfer function calculating unit 163 provides the calculated transfer function H$_2$ of the listening space to the musical signal processing unit 132. The musical signal processing unit 132 performs various kinds of filter processes on the musical signal using the transfer function H$_2$ of the listening space. A timing at which the FB microphone signal buffer unit 161 and the FF microphone signal buffer unit 164 start to buffer the collection signal may be a timing at which the listening environment characteristic information acquisition condition is detected.

(1-4. Musical Signal Processing Unit)

Figure 4:
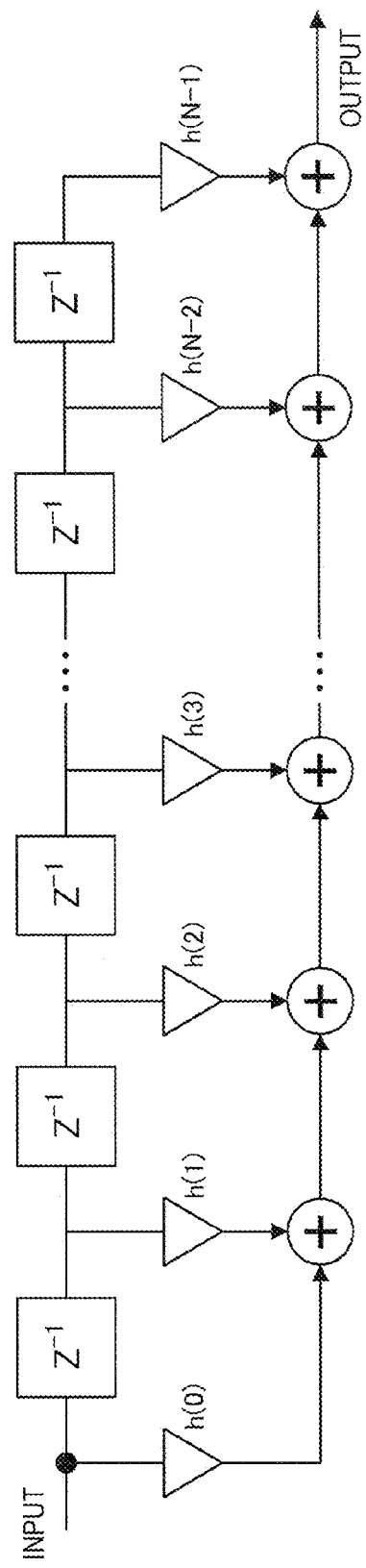
FIG. 4 is a block diagram illustrating an exemplary configuration of a musical signal processing unit.

A function of the musical signal processing unit 132 illustrated in FIG. 2 will be described with reference to FIG. 4. FIG. 4 is a block diagram illustrating an exemplary configuration of the musical signal processing unit 132.

FIG. 4 schematically illustrates an example of a filter circuit that can constitute the musical signal processing unit 132. As illustrated in FIG. 4, in the first embodiment, the musical signal processing unit 132 may be preferably configured with a finite impulse response (FIR) filter. Using a transfer function h of the time domain expression obtained by performing an inverse Fourier transform on the transfer function H$_2$ of the listening space (the frequency domain expression) acquired by the listening environment characteristic information acquiring unit 131 as a parameter of the FIR filter, the filter circuit in which the acoustic characteristic of the listening space is reflected can be implemented.

Specifically, the musical signal processing unit 132 obtains the transfer function h of the time domain expression using the following Formula (2) and then performs convolution on the musical signal through the FIR filter of the transfer function h. Accordingly, the acoustic characteristic of the listening space (for example, the reverberation characteristic, the frequency characteristic, or the like) is applied to the musical signal. Here, N indicates the number of points in a discrete Fourier transform (DFT).

[Math. 2]

$$h(n) = \frac{1}{N} \sum_{k=0}^{N-1} H(n) e^{j\frac{2\pi kn}{N}} \quad (n = 0, 1, \ldots, N-1) \quad (2)$$

The musical signal processing unit 132 outputs the musical signal to which the acoustic characteristic of the listening space is applied by the filtering to the speaker 120 via the DAC 122 and the amplifier 121. As the post-signal processing musical signal is output from the speaker 120, music having a feeling of more openness which is more harmonious with the external sound according to the acoustic characteristic of the listening space is provided to the user. As illustrated in FIG. 2, the musical signal that has undergone the filtering by the musical signal processing unit 132 may be output from the speaker 120 in a state in which the noise cancellation signal and/or the monitor signal is superimposed by the adder 160. Accordingly, music that is more harmonious can be provided to the user through the monitor sound in a state in which noise is further reduced.

The filter circuit having the same operation can even be implemented through a technique of performing the DFT on the musical signal using the transfer function H$_2$ in the frequency domain without change and multiplying the musical signal that has undergone the DFT by the transfer function H$_2$ in the frequency domain in order to reduce a computation amount. Further, an implementation in which both the FIR filter and the FFT are used is possible.

Here, as described above, in the first embodiment, the transfer function h of the time domain expression is used as the parameter of the FIR filter, but the musical signal processing unit 132 may not update the parameter of the FIR filter when a newly obtained parameter of the FIR filter (that is, the transfer function h) is not too different from a current setting value. For example, the musical signal processing unit 132 may update the parameter when a difference between a current parameter set in the FIR filter and a new parameter obtained by a current measurement is larger than a predetermined threshold value. If the characteristic of the FIR filter is too frequently changed, the musical signal wobbles, and a feeling of listening of the user is likely to be damaged. Thus, as described above, when a newly obtained parameter is not too different from the current setting value, the parameter is not updated, and thus music can be more stably provided to the user.

The first embodiment has been described above. As described above, according to the first embodiment, the transfer function H$_2$ of the listening space is acquired based on the spoken voice of the user, and the acoustic characteristic of the listening space is applied to the musical signal based on the transfer function H$_2$. Thus, music having a feeling of more openness that is more harmonious with the external sound can be provided to the user. Further, for example, when the user gives an instruction to the information processing device by voice or when the user makes a phone call using a telephone function, the transfer function H$_2$ may be acquired at an arbitrary timing at which the user speaks a word as a normal operation. Thus, the user need not perform an operation (an utterance) for obtaining the transfer function H$_2$, the transfer function H$_2$ is automatically acquired based on a word spoken by the user for other purposes, the musical signal is corrected, and thus convenience of the user is improved.

2. Second Embodiment

Next, a second embodiment of the present disclosure will be described. In the second embodiment, a predetermined measurement sound is used as the external sound. As the measurement sound, a sound related to the musical signal, an uncorrelated noise in the listening environment, or the like may be used. The listening environment characteristic information is acquired based on the measurement sound collected by the microphone. Then, the musical signal is filtered according to the filter characteristic based on the acquired listening environment characteristic information. Accordingly, the music in which the acoustic characteristic of the listening environment is reflected and which is more harmonious with the external sound is provided to the user.

(2-1. Overview of Second Embodiment)

Figure 5:
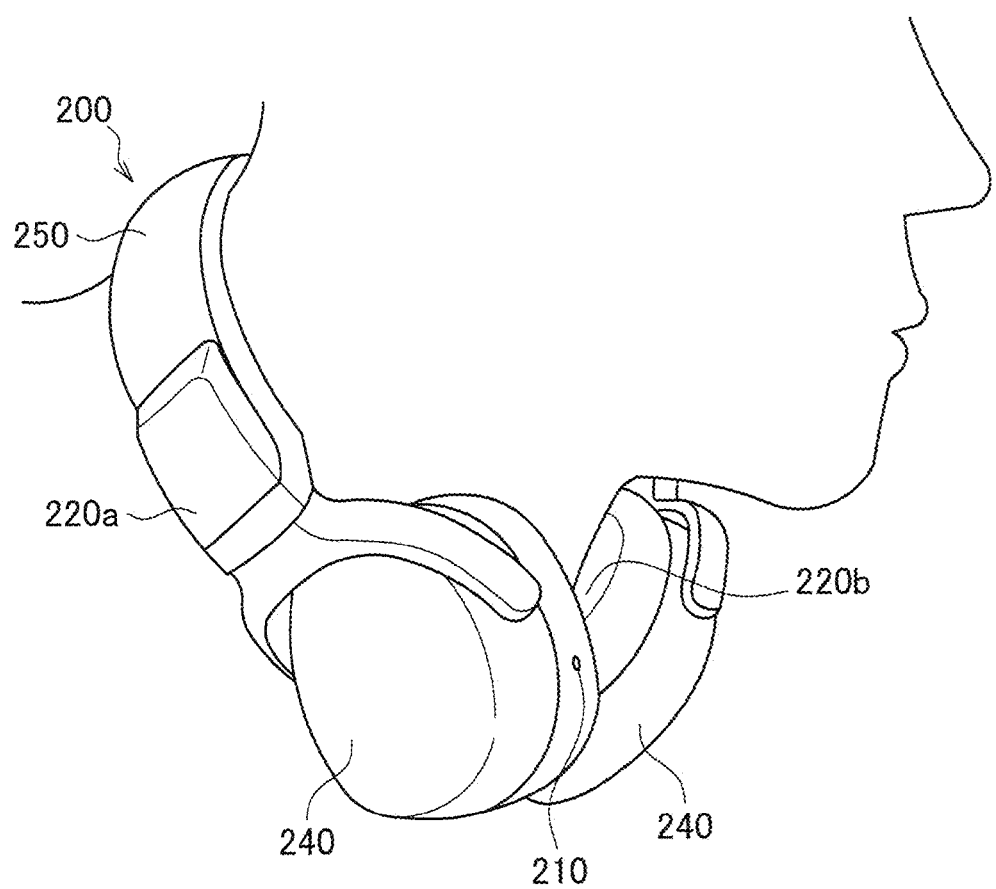
FIG. 5 is a schematic diagram illustrating an exemplary configuration of a headphone according to a second embodiment.

An overview of the second embodiment will be described with reference to FIG. 5 together with an exemplary configuration of the headphone according to the second embodiment. FIG. 5 is a schematic diagram illustrating an exemplary configuration of the headphone according to the second embodiment.

Referring to FIG. 5, a headphone 200 according to the second embodiment includes a pair of housings 240 worn on the ears of the user, a support member 250 that couples the pair of housings 240 with each other and is curved in an arch form, a driver unit 220b (a speaker 220b) that is installed on an inner side of the housing 240 and generates a sound by vibrating the vibrating plate according to the musical signal, a speaker 220a that outputs the musical signal toward the listening environment which is an external space, and a microphone 210 that is installed on an outer side of the housing 240 and collects the external sound. Although not illustrated in FIG. 5 for the sake of simplicity, the headphone 200 may be equipped with various kinds of components included in common headphones such as a cable for supplying the musical signal to the speakers 220a and 220b.

The microphone 210 is a microphone that is installed for the noise cancellation function based on the FF scheme. The noise cancellation signal may be generated based on the external sound collected by the microphone 210. The external sound collected by the microphone 210 may be used for the monitor function. The monitor signal may be generated based on the external sound collected by the microphone 210. As the musical signal on which the noise cancellation signal is superimposed is output from the speakers 220a and 220b, music in which noise is reduced is provided to the user. Further, as the musical signal on which the monitor signal is superimposed is output from the speakers 220a and 220b, the external sound is provided to the user together with the music.

In the second embodiment, for example, using the headphone 200 having the configuration illustrated in FIG. 5, the transfer function of the listening environment of the user is calculated as the listening environment characteristic information based on the external sound collected by the microphone 210. For example, in the second embodiment, the musical signal is output from the speaker 220a toward the listening environment, and the transfer function may be acquired using the musical signal as the signal of the measurement sound (the measurement signal). Further, for example, in the second embodiment, a correlation function of the output musical signal and the collection signal may be acquired as the listening environment characteristic information using the musical signal as the measurement signal. Further, for example, in the second embodiment, an autocorrelation function of the collection signal may be acquired as the listening environment characteristic information using the uncorrelated noise such as the noisy sound as the measurement signal. Filtering based on the acquired transfer function or the correlation function is performed on the musical signal, music in which the acoustic characteristic of the external environment is considered and which is more harmonious with the external sound is provided to the user, and thus a feeling of more openness can be given to the user.

In the following description, first, an exemplary configuration of an acoustic adjustment system for implementing the above-described processes according to the second embodiment will be described in (2-2. Configuration of system). Then, a method of acquiring the listening environment characteristic information according to the second embodiment will be described in detail in (2-3. Listening environment characteristic information acquiring unit). Further, filtering of the musical signal based on the acquired listening environment characteristic information will be described in detail in (2-4. Musical signal processing unit).

(2-2. Configuration of System)

Figure 6:
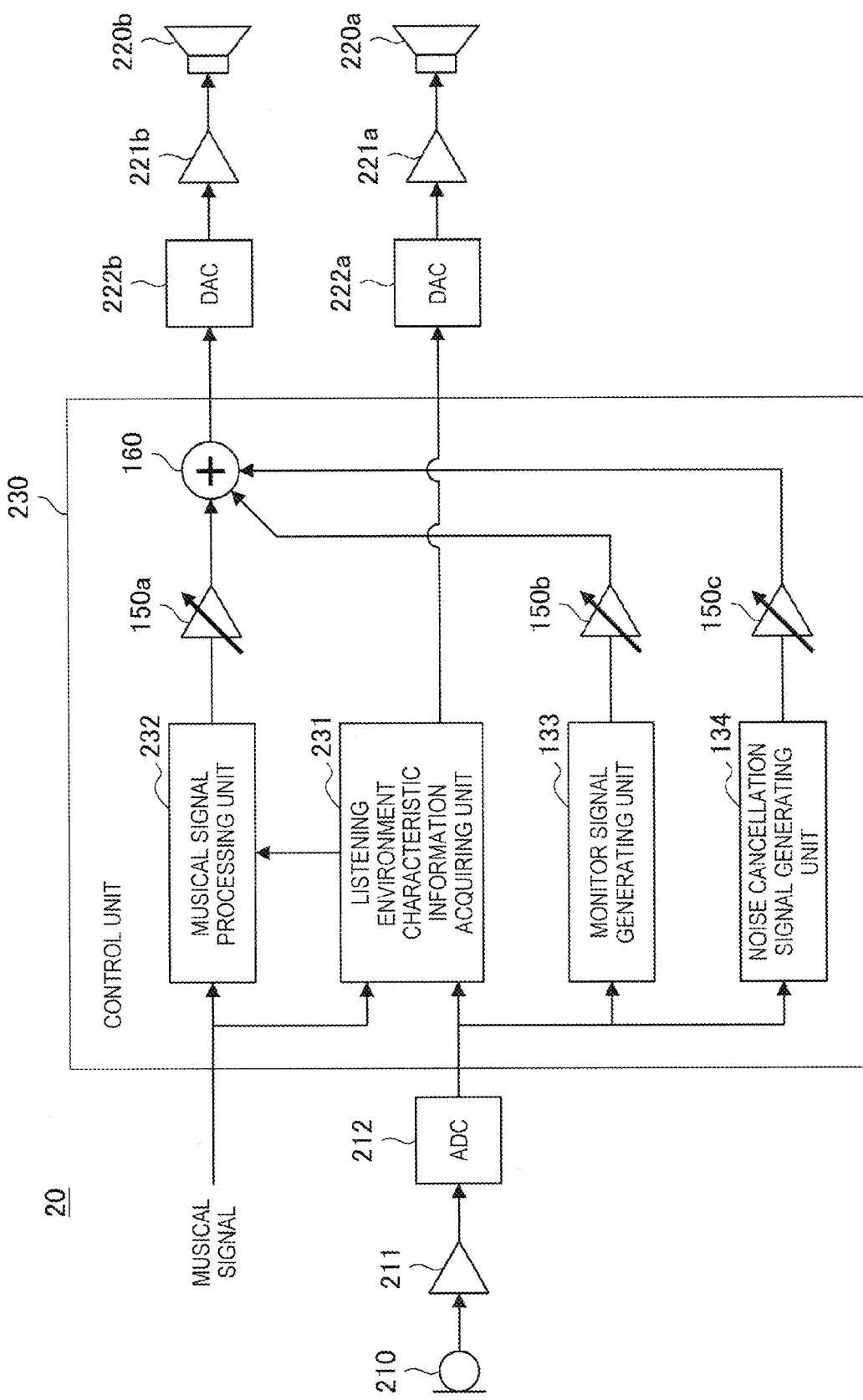
FIG. 6 is a block diagram illustrating an exemplary configuration of an acoustic adjustment system according to the second embodiment.

A configuration of the acoustic adjustment system according to the second embodiment will be described with reference to FIG. 6. FIG. 6 is a block diagram illustrating an exemplary configuration of the acoustic adjustment system according to the second embodiment.

Referring to FIG. 6, an acoustic adjustment system 20 according to the second embodiment includes a microphone 210, speakers 220a and 220b, and a control unit 230. The acoustic adjustment system 20 according to the second embodiment differs from the acoustic adjustment system 10 illustrated in FIG. 2 according to the first embodiment in that configurations of the microphone 110 and the speaker 120 are changed, and functions of the listening environment characteristic information acquiring unit 131 and the musical signal processing unit 132 are changed. Thus, the following description of the configuration of the acoustic adjustment system 20 will proceed with a difference with the acoustic adjustment system 10 according to the first embodiment, and a detailed description of duplicated matters will be omitted.

The microphone 210 collects the sound, converts the sound into an electrical signal, and acquires a signal corresponding to the sound (that is, the collection signal). The microphone 210 corresponds to the microphone 210 illustrated in FIG. 5. In the second embodiment, the microphone 210 collects a predetermined measurement sound as the external sound. For example, the measurement sound includes the sound related to the musical signal output from the speaker 220a toward the outside and the uncorrelated noise such as the noisy sound. The collection signal obtained by the microphone 210 is appropriately amplified by an amplifier 211, converted into a digital signal by an ADC 212, and then input to a listening environment characteristic information acquiring unit 231, a monitor signal generating unit 133, and a noise cancellation signal generating unit 134 of the control unit 230 which will be described later.

Each of the speakers 220a and 220b outputs a sound according to the audio signal by vibrating the vibrating plate according to the audio signal. The speakers 220a and 220b correspond to the speakers 220a and 220b illustrated in FIG. 5. The speaker 220b is installed on the inner side of the housing 240 and outputs the musical signal in which the acoustic characteristic of the listening environment is reflected toward the ear of the user. The noise cancellation signal and/or the monitor signal may be superimposed on the musical signal and then output from the speaker 220b. On the other hand, the speaker 220a outputs the musical signal toward the external space (that is, the listening environment). The musical signal output from the speaker 220a may be a pre-signal processing musical signal (that does not undergo filtering) that is provided from, for example, an external device (for example, various kinds of reproduction devices). However, the musical signal output from the speaker 220a may have a known characteristic or may be a post-signal processing musical signal. Similarly to the speaker 120 according to the first embodiment, DACs 222a and 222b and amplifiers 221a and 221b are installed at a stage before the speakers 220a and 220b.

The control unit 230 is configured with various kinds of processors such as a CPU or a DSP, and executes various kinds of signal processing performed in the acoustic adjustment system 20. The control unit 230 has functions such as a listening environment characteristic information acquiring unit 231, a musical signal processing unit 232, a monitor signal generating unit 133, and a noise cancellation signal generating unit 134. The functions of the control unit 230 can be implemented as the processor constituting the control unit 230 operates according to a predetermined program. The processor constituting the control unit 230 may be mounted in the headphone 200 illustrated in FIG. 5 or may be mounted in an information processing device (for example, a mobile terminal such as a smart phone carried by the user) separate from the headphone 200 illustrated in FIG. 5. Alternatively, the functions of the control unit 230 may be implemented by a processor of an information processing device such as a server installed on a network (on a so-called cloud). When the processor constituting the control unit 230 is mounted in a mobile terminal or a server which is separated from the headphone 200, the headphone 200 performs transmission and reception of various kinds of information with the mobile terminal or the server, and thus various kinds of processes can be performed in the acoustic adjustment system 20. The functions of the monitor signal generating unit 133 and the noise cancellation signal generating unit 134 are the same as the functions of the configuration illustrated in FIG. 2, and thus a detailed description thereof will be omitted.

The listening environment characteristic information acquiring unit 231 acquires the listening environment characteristic information indicating the acoustic characteristic of the listening environment based on the external sound collected by the microphone 210. In the second embodiment, the listening environment characteristic information acquiring unit 231 can acquire the transfer function of the listening environment, the correlation function of the output musical signal and the collection signal, and/or the auto-correlation function of the uncorrelated noise as the listening environment characteristic information based on the measurement sound collected by the microphone 210. The listening environment characteristic information acquiring unit 131 provides the acquired listening environment characteristic information to the musical signal processing unit 232. Similarly to the listening environment characteristic information acquiring unit 131 according to the first embodiment, the listening environment characteristic information acquiring unit 231 can start the process of acquiring the listening environment characteristic information at a timing at which the listening environment characteristic information acquisition condition is detected. The listening environment characteristic information acquiring unit 231 will be described in detail in (2-3. Listening environment characteristic information acquiring unit).

The musical signal processing unit 232 performs predetermined signal processing on the musical signal based on the listening environment characteristic information acquired by the listening environment characteristic information acquiring unit 231. In the second embodiment, the musical signal processing unit 232 performs filtering of the musical signal based on the transfer function or the correlation function that can be acquired by the listening environment characteristic information acquiring unit 231. Specifically, the musical signal processing unit 232 performs filtering of the musical signal through a filter having a filter characteristic in which the characteristic of the transfer function of the listening environment and/or the correlation function is reflected, and thus can apply, for example, the reverberation characteristic according to the external environment (the early reflection period of time, the reverberation period of time, or the like) to the musical signal. The musical signal processing unit 232 can apply the frequency characteristic according to the external environment to the musical signal based on the transfer function and/or the correlation function of the listening environment, for example, using an equalizer. The musical signal that has undergone signal processing by the musical signal processing unit 232 appropriately undergoes a gain adjustment by a variable amplifier 150a and is then output from the speaker 220b via the DAC 222b and the amplifier 221b. The post-signal processing musical signal may be added to the noise cancellation signal and/or the monitor signal through an adder 160 and then output to the speaker 220b in this state as illustrated in FIG. 2. The function of the musical signal processing unit 232 will be described in detail in (2-4. Musical signal processing unit).

The configuration of the acoustic adjustment system 20 according to the second embodiment has been described above. In the second embodiment, various kinds of signal processing, particularly the processes in the control unit 230, may be performed by, for example, one processor or one information processing device or may be performed by collaboration of a plurality of processors or a plurality of information processing devices in the acoustic adjustment system 20 similarly to the first embodiment. A device configuration that can be implemented in the acoustic adjustment system 20 according to the second embodiment is not limited to the configuration illustrated in FIG. 6 and may be arbitrary. For example, the acoustic adjustment system 20 illustrated in FIG. 2 may be configured as an integrated device, and the device (the reproduction device) that provides a musical signal to the control unit 230 may be included in the device.

(2-3. Listening Environment Characteristic Information Acquiring Unit)

Figure 7:
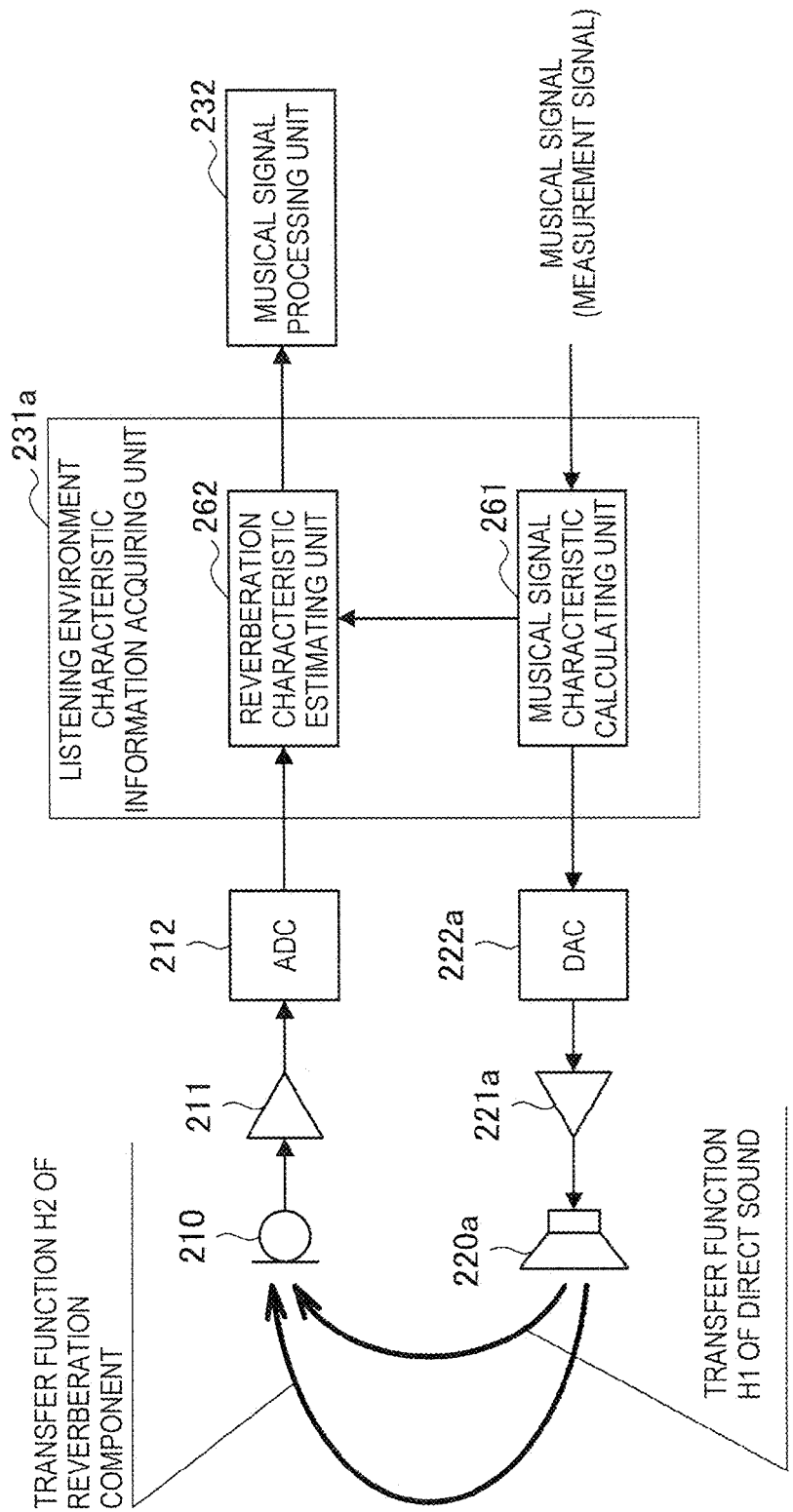
FIG. 7 is a block diagram illustrating an exemplary configuration for acquiring a transfer function using a musical signal as a measurement signal in a listening environment characteristic information acquiring unit.
Figure 8:
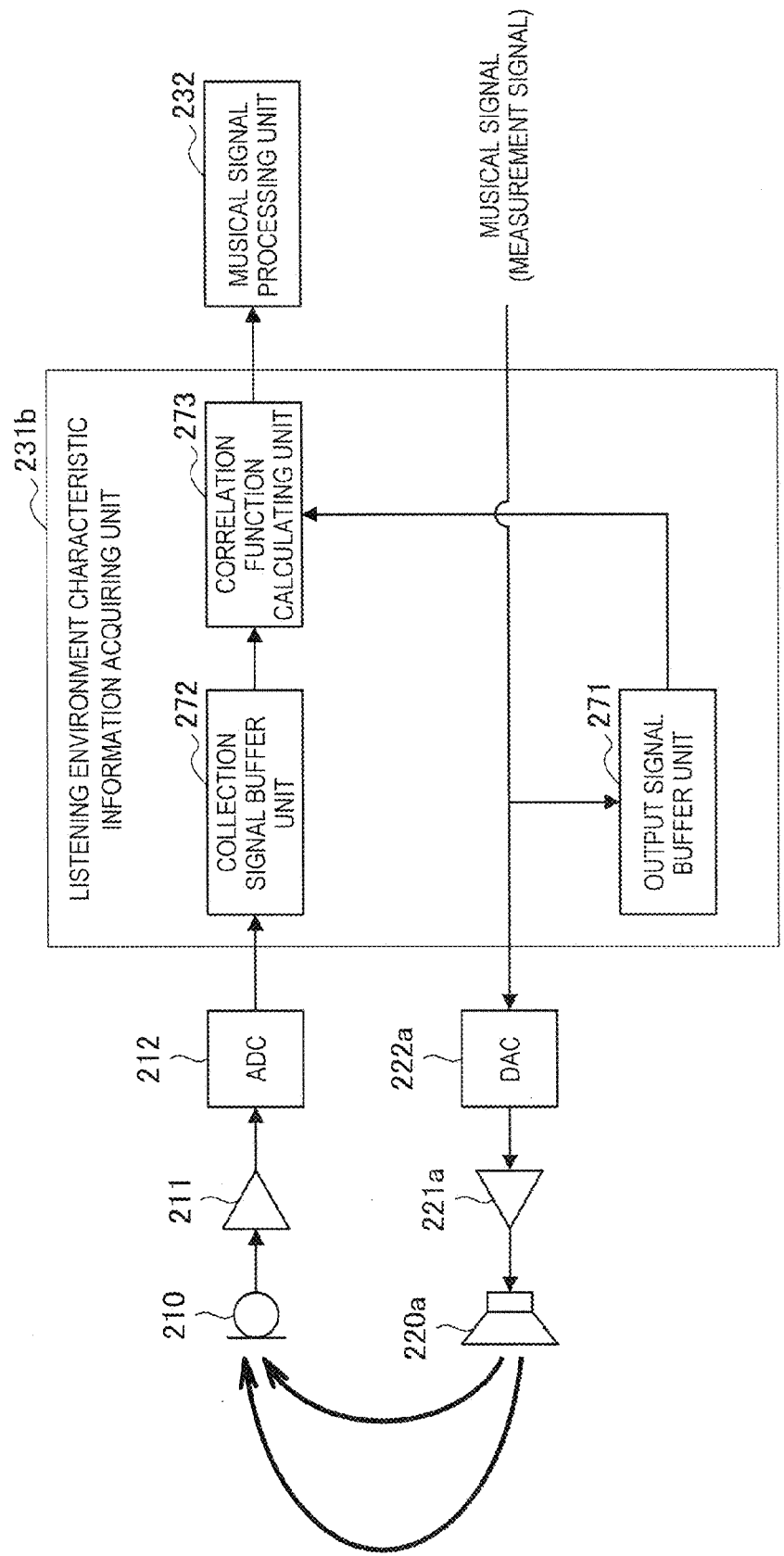
FIG. 8 is a block diagram illustrating an exemplary configuration for acquiring a correlation function using a musical signal as a measurement signal in a listening environment characteristic information acquiring unit.
Figure 10:
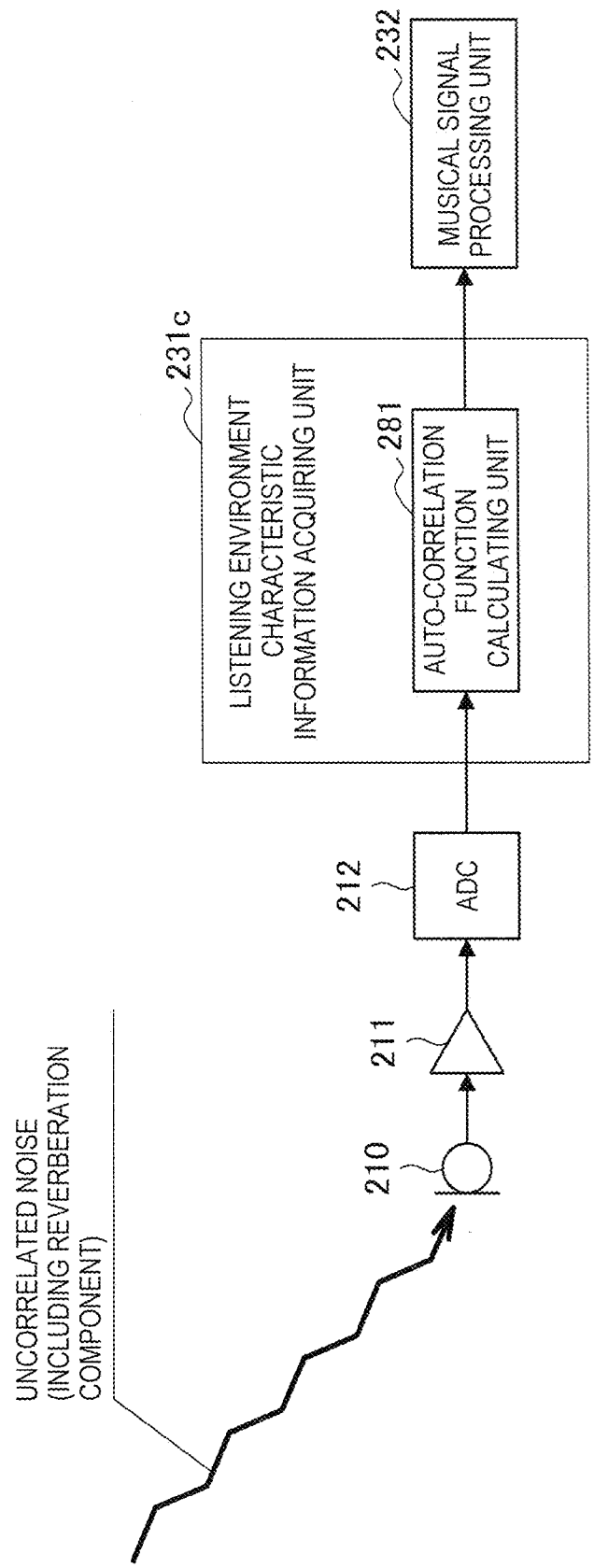
FIG. 10 is a block diagram illustrating an exemplary configuration for acquiring a correlation function using an uncorrelated noise as a measurement signal in a listening environment characteristic information acquiring unit.

A function of the listening environment characteristic information acquiring unit 231 according to the second embodiment will be described. As described above, the listening environment characteristic information acquiring unit 231 can acquire a transfer function of a listening environment, a correlation function of an output musical signal and a collection signal, and/or an auto-correlation function of an uncorrelated noise as listening environment characteristic information based on a measurement sound collected by the microphone 210. The listening environment characteristic information acquiring unit 231 may have a configuration that differs according to the listening environment characteristic information to be acquired. Here, a configuration of the listening environment characteristic information acquiring unit 231 according to the listening environment characteristic information to be acquired will be described in (2-3-1. Configuration of acquiring transfer function using musical signal as measurement signal), (2-3-2. Configuration of acquiring correlation function using musical signal as measurement signal), and (2-3-3. Configuration of acquiring correlation function using uncorrelated noise as the measurement signal). In FIG. 7, FIG. 8, and FIG. 10, for the sake of convenience, different reference numerals are added to the listening environment characteristic information acquiring unit 231 (listening environment characteristic information acquiring units 231a, 231b, and 231c) to describe different configurations of the listening environment characteristic information acquiring unit 231, and all of the listening environment characteristic information acquiring units correspond to the listening environment characteristic information acquiring unit 231 illustrated in FIG. 6.

(2-3-1. Configuration of Acquiring Transfer Function Using Musical Signal as Measurement Signal)

An exemplary configuration of acquiring a transfer function using a musical signal as a measurement signal in the listening environment characteristic information acquiring unit 231 illustrated in FIG. 2 will be described with reference to FIG. 7. FIG. 7 is a block diagram illustrating an exemplary configuration of acquiring a transfer function using a musical signal as a measurement signal in the listening environment characteristic information acquiring unit 231.

Referring to FIG. 7, the listening environment characteristic information acquiring unit 231a includes functions such as a musical signal characteristic calculating unit 261 and a reverberation characteristic estimating unit 262. In FIG. 7, a functional configuration of the listening environment characteristic information acquiring unit 231a is illustrated, and it is illustrated with an extracted configuration related to the functions of the listening environment characteristic information acquiring unit 231 in the configuration of the acoustic adjustment system 20 illustrated in FIG. 6.

In the exemplary configuration illustrated in FIG. 7, a musical signal is output from the speaker 220a as a measurement signal, and the musical signal is collected by the microphone 210. A parameter indicating the musical signal used for measurement is indicated by S, a transfer function for the microphone 210, the amplifier 211, and the ADC 212 is indicated by M, and a transfer function for the DAC 222a, the amplifier 221a, and the speaker 220a is indicated by D. Here, both of the transfer functions M and D are known values that can be decided at a time of design.

A transfer function until the musical signal output from the speaker 220a arrives at the microphone 210 through a space in which the user speaks (that is, a listening environment) is indicated by Ha. A component of the transfer function Ha corresponding to a path through which an acoustic wave arrives directly at the microphone 210 from the speaker 220a in a state in which there is no reflection by a wall of a room or the like is indicated by $H_1$, and a component of the transfer function Ha other than $H_1$ is indicated by $H_2$. The transfer function $H_1$ indicates a component that is not influenced by the listening environment. On the other hand, the transfer function $H_2$ indicates a component which varies according to the listening environment and in which an acoustic characteristic of the listening environment is reflected. $H_1$ is a known value that can be acquired in advance by measurement in an anechoic room or the like, for example, when the headphone 200 is designed. At this time, Ha, $H_1$, and $H_2$ satisfy the following Formula (3).

[Math. 3]

$$Ha = H_1 + H_2 \qquad (3)$$

The listening environment characteristic information acquiring unit 231a can acquire the transfer function $H_2$ in which the acoustic characteristic of the listening space is reflected based on the musical signal that is output from the speaker 220a and collected by the microphone 210. Specifically, the musical signal is input from an external device (a reproduction device) to the musical signal characteristic calculating unit 261 as the measurement signal. The musical signal characteristic calculating unit 261 buffers the musical signal with a predetermined frame length according to a trigger of a measurement start, and performs a Fourier transform. Accordingly, the musical signal characteristic calculating unit 261 obtains a parameter S (Source) indicating the musical signal. The musical signal characteristic calculating unit 261 provides the acquired parameter S to the reverberation characteristic estimating unit 262. The musical signal characteristic calculating unit 261 provides the musical signal to the DAC 222a. The musical signal is output from the speaker 220a via the DAC 222a and the amplifier 221a.

The musical signal output from the speaker 220a is collected by the microphone 210. The musical signal collected by the microphone 210 (that is, the collection signal) is input to the reverberation characteristic estimating unit 262 via the amplifier 211 and the ADC 212. The reverberation characteristic estimating unit 262 buffers the collection signal with the same frame length as in the musical signal characteristic calculating unit 261 according to a trigger of a measurement start and performs a Fourier transform. A signal obtained as a result of calculation by the reverberation characteristic estimating unit 262 can be indicated by "M*D*S*Ha."

Using the signal A*D*S*Ha, the transfer function Ha can be indicated as in the following Formula (4).

[Math. 4]

$$Ha = \frac{MDSHa}{MDS} \qquad (4)$$

The transfer function $H_2$ can be indicated as in the following Formula (5) in view of Formula (3) and Formula (4).

[Math. 5]

$$H_2 = \frac{MDSHa}{MDS} - H_1 \qquad (5)$$

Here, as described above, the transfer functions $H_1$, A and D are known values. The parameter S is calculated by the musical signal characteristic calculating unit 261. Thus, the reverberation characteristic estimating unit 262 can calculate the transfer function $H_2$ of the listening environment by performing the calculation indicated by Formula (5) using the known values.

The reverberation characteristic estimating unit 262 provides the calculated transfer function $H_2$ of the listening space to the musical signal processing unit 232. The musical signal processing unit 232 performs various kinds of filter processes on the musical signal using the transfer function $H_2$ of the listening space. A trigger by which the musical signal characteristic calculating unit 261 and the reverberation characteristic estimating unit 262 start to buffer the musical signal and the collection signal may be detection of the listening environment characteristic information acquisition condition.

The exemplary configuration of acquiring a transfer function using a musical signal as a measurement signal has been described above. Here, in the first embodiment, the transfer function $H_2$ is calculated using a spoken voice of the user. Since a characteristic of the spoken voice is obscure, as described above in (1-3. Listening environment characteristic information acquiring unit), a technique of obtaining the transfer function $H_2$ without defining an audio source as a parameter is applied in the first embodiment. On the other hand, in the second embodiment, since a characteristic of the speaker 220a (the transfer function D) can be known, the transfer function $H_2$ can be obtained using an audio source defined as the parameter as described above. As described above, the transfer function $H_2$ of the listening space can be calculated using various techniques according the configurations of the headphones 100 and 200 (in further detail, the number of arrangements or an arrangement position of the speakers 120, 220a, and 220b and the microphones 110 and 210).

(2-3-2. Configuration of Acquiring Correlation Function Using Musical Signal as Measurement Signal)

An exemplary configuration of acquiring a correlation function using a musical signal as a measurement signal in the listening environment characteristic information acquiring unit 231 illustrated in FIG. 2 will be described with reference to FIG. 8. FIG. 8 is a block diagram illustrating an exemplary configuration of acquiring a correlation function using a musical signal as a measurement signal in the listening environment characteristic information acquiring unit 231.

Referring to FIG. 8, the listening environment characteristic information acquiring unit 231b has functions such as an output signal buffer unit 271, a collection signal buffer unit 272, and a correlation function calculating unit 273. In FIG. 8, a functional configuration of the listening environment characteristic information acquiring unit 231b is illustrated, and it is illustrated with an extracted configuration related to the functions of the listening environment characteristic information acquiring unit 231 in the configuration of the acoustic adjustment system 20 illustrated in FIG. 6.

In the exemplary configuration illustrated in FIG. 8, a musical signal is output from the speaker 220a as a measurement signal, and the musical signal is collected by the microphone 210. Then, a correlation function of the output musical signal and the collected musical signal (that is, the collection signal) is calculated. The correlation function can be understood to be a function in which an acoustic characteristic of a listening environment is reflected.

Specifically, as illustrated in FIG. 8, a musical signal input from an external device (a reproduction device) is output from the speaker 220a via the DAC 222a and the amplifier 221a. In a state in which the musical signal is output from the speaker 220a, the output signal buffer unit 271 buffers the musical signal during a predetermined period of time according to a trigger of a measurement start. The output signal buffer unit 271 provides the buffered musical signal to the correlation function calculating unit 273.

The musical signal output from the speaker 220a is collected by the microphone 210. The collection signal obtained by the microphone 210 is input to the collection signal buffer unit 272 via the amplifier 211 and the ADC 212. The collection signal buffer unit 272 is synchronized with the output signal buffer unit 271, and buffers the collection signal during the same period of time at the same timing as the buffering of the musical signal by the output signal buffer unit 271. The collection signal buffer unit 272 provides the buffered collection signal to the correlation function calculating unit 273.

Figure 9:
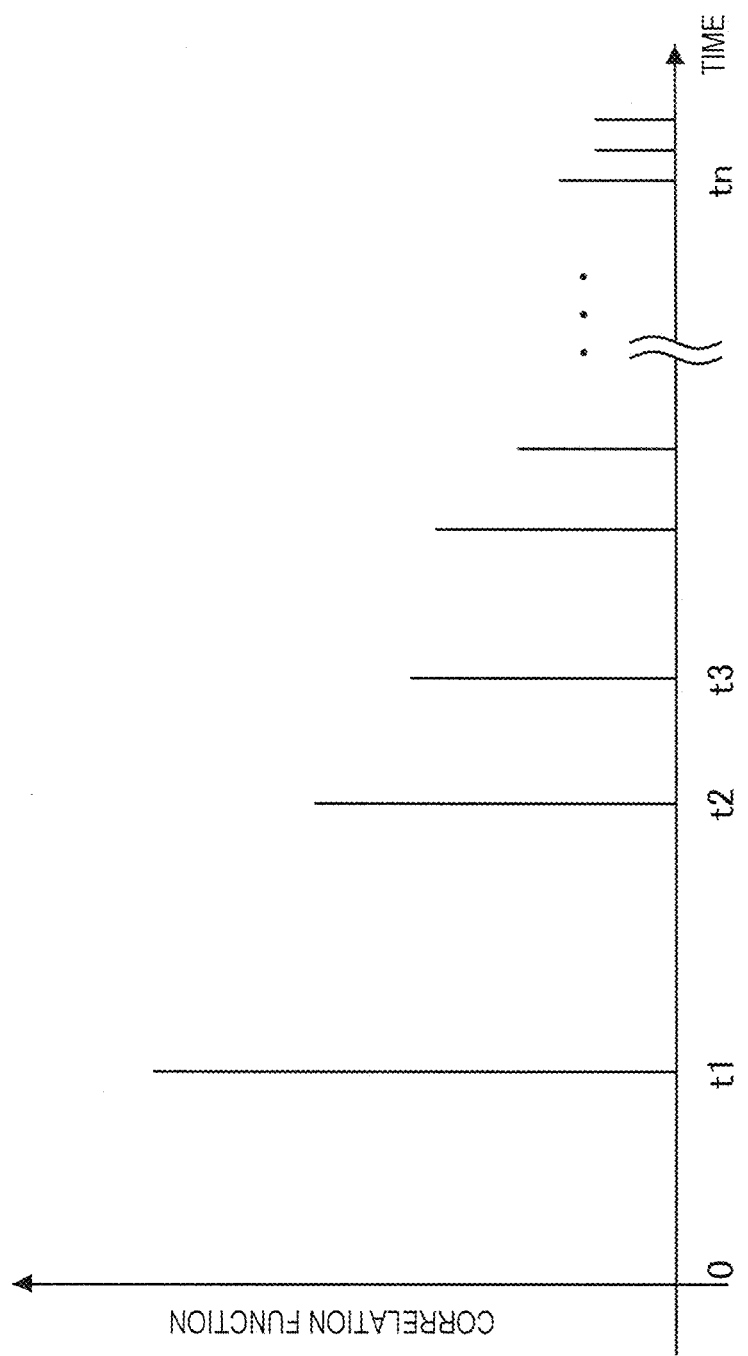
FIG. 9 is a schematic diagram illustrating an example of a correlation function that can be calculated by a correlation function calculating unit.

The correlation function calculating unit 273 calculates the correlation function of the output musical signal buffered by the output signal buffer unit 271 and the collected musical signal buffered by the collection signal buffer unit 272. FIG. 9 illustrates an example of a correlation function that may be calculated by the correlation function calculating unit 273. FIG. 9 is a schematic diagram illustrating an example of the correlation function that may be calculated by the correlation function calculating unit 273. As illustrated in FIG. 9, times $t_1, t_2, t_3, \ldots,$ and $t_n$ and peaks of the correlation function at predetermined times are shown. A peak shown at the time $t_1$ indicates a component that is directly transferred from the speaker 220a to the microphone 210, and a peak shown after the time $t_2$ indicates a component that is output from the speaker 220a, reflected by a wall, a ceiling, or the like of the listening environment, and then input to the microphone 210. Components corresponding to peaks shown after the time $t_2$ are exponentially attenuated with the lapse of time and approach 0. It is possible to estimate a period of time of up to an early reflected sound, a reverberation period of time, and the like which are main factors of a reverberation characteristic based on a period of time up to the time $t_n$ and an attenuation inclination.

The correlation function calculating unit 273 provides the calculated correlation function to the musical signal processing unit 232. The musical signal processing unit 232 estimates, for example, a reverberation characteristic of the listening environment using the correlation function, and performs various kinds of filter processes on the musical signal using the estimated reverberation characteristic. A trigger by which the output signal buffer unit 271 and the collection signal buffer unit 272 start to buffer the musical signal and the collection signal may be the detection of the listening environment characteristic information acquisition condition.

The exemplary configuration of acquiring a correlation function using a musical signal as the measurement signal has been described above. As described above, instead of a transfer function, a correlation function of musical signals before and after output may be acquired as listening environment characteristic information in the second embodiment. In the configuration described in (2-3-1. Configuration of acquiring transfer function using musical signal as measurement signal) and this section, a musical signal is used as the measurement signal, but the second embodiment is not limited to this example. For example, a dedicated sound whose frequency band, volume level, or the like is adjusted for measurement may be used as the measurement sound. For example, more stable characteristic information is obtained using a dedicated measurement sound having a sufficient frequency band or volume level. Depending on the listening environment, there is a possibility that a feeling of discomfort will be given to other people around the user when music is output toward the outside. In this case, the feeling of discomfort can be reduced using a dedicated measurement sound whose frequency band or volume level is appropriately adjusted.

(2-3-3. Configuration of Acquiring Correlation Function Using Uncorrelated Noise as the Measurement Signal)

An exemplary configuration of acquiring a correlation function using an uncorrelated noise as a measurement signal in the listening environment characteristic information acquiring unit 231 illustrated in FIG. 2 will be described with reference to FIG. 10. FIG. 10 is a block diagram illustrating an exemplary configuration for acquiring a correlation function using an uncorrelated noise as a measurement signal in the listening environment characteristic information acquiring unit 231.

Referring to FIG. 10, the listening environment characteristic information acquiring unit 231c has a function such as a function of an auto-correlation function calculating unit 281. In FIG. 10, a functional configuration of the listening environment characteristic information acquiring unit 231c is illustrated, and it is illustrated together with an extracted configuration related to the functions of the listening environment characteristic information acquiring unit 231 in the configuration of the acoustic adjustment system 20 illustrated in FIG. 6.

In the exemplary configuration illustrated in FIG. 10, an external sound including noise that is uncorrelated (an uncorrelated noise) is collected through the microphone 210. Then, an auto-correlation function for the collected uncorrelated noise is calculated. Since the collected uncorrelated noise includes a component in which an acoustic characteristic of a listening environment is reflected such as a reverberation component, the auto-correlation function can be understood to be a function in which the acoustic characteristic of the listening environment is reflected.

Specifically, as illustrated in FIG. 10, the external sound including the uncorrelated noise is collected by the microphone 210. A musical signal collected by the microphone 210 (that is, a collection signal) is input to the auto-correlation function calculating unit 281 via the amplifier 211 and the ADC 212. The auto-correlation function calculating unit 281 buffers the collection signal during a predetermined period of time according to a trigger of a measurement start, and calculates the auto-correlation function.

Here, when a noise such as a surrounding noise is a noise that is sufficiently uncorrelated, an auto-correlation function $Rx(\tau)$ of the noise itself is 1 at a time 0 and 0 at other times. On the other hand, when a noise source of the uncorrelated noise is indicated by x(t) and the collection signal is indicated by y(t), a correlation function of x(t) and y(t) is indicated by convolution of the auto-correlation function $Rx(\tau)$ of a noise serving as an input signal and a spatial impulse response. Here, as described above, when the input signal is the uncorrelated noise, $Rx(\tau)$ becomes a delta function, and the auto-correlation function of an impulse response can be obtained as the auto-correlation function of y(t).

The auto-correlation function calculating unit 281 repeatedly performs calculation of the auto-correlation function two or more times. Then, an auto-correlation function that is finally employed is decided based on a calculation result. For example, the auto-correlation function calculating unit 281 can employ an auto-correlation function having a good S/N ratio among a plurality of calculated auto-correlation functions. For example, the auto-correlation function calculating unit 281 can employ an average value of the plurality of calculated auto-correlation functions as the auto-correlation function. For example, the auto-correlation function calculating unit 281 can extract a common component of the plurality of calculated auto-correlation functions, and when a pitch component is included in the collection signal, the auto-correlation function calculating unit 281 excludes an auto-correlation function calculated based on the collection signal and decides the auto-correlation function that is finally employed based on the remaining auto-correlation functions.

The auto-correlation function calculating unit 281 provides an auto-correlation function that is decided to be finally employed to the musical signal processing unit 232. The musical signal processing unit 232 estimates, for example, a reverberation characteristic of the listening environment using the auto-correlation function, and performs various kinds of filter processes on the musical signal using the estimated reverberation characteristic. A trigger by which the auto-correlation function calculating unit 281 starts to buffer the collection signal and calculate the auto-correlation function may be the detection of the listening environment characteristic information acquisition condition.

The exemplary configuration of acquiring a correlation function using an uncorrelated noise as a measurement signal has been described above. As described above, in this exemplary configuration, it is possible to measure the correlation function indicating the acoustic characteristic of the listening environment using the uncorrelated noise as the measurement signal. Thus, it is unnecessary to output the measurement signal such as the musical signal, and it is possible to acquire the listening environment characteristic information more conveniently. Further, when the uncorrelated noise is used as the measurement signal, it is also possible to acquire the acoustic characteristic of the listening environment using a cross-spectral technique in the frequency domain in addition to the auto-correlation function.

Here, the above-described method of acquiring a correlation function based on an uncorrelated noise can be performed as long as a microphone capable of collecting an external sound is provided, and it is unnecessary to output the measurement signal itself toward the outside. Thus, even in a configuration including no speaker that outputs a sound toward the outside as in the headphone 100 illustrated in FIG. 1 according to the first embodiment, the method of acquiring a correlation function based on an uncorrelated noise can be performed as long as a configuration capable of collecting an external sound is provided as in the microphone 110a.

(2-4. Musical Signal Processing Unit)

Figure 11:
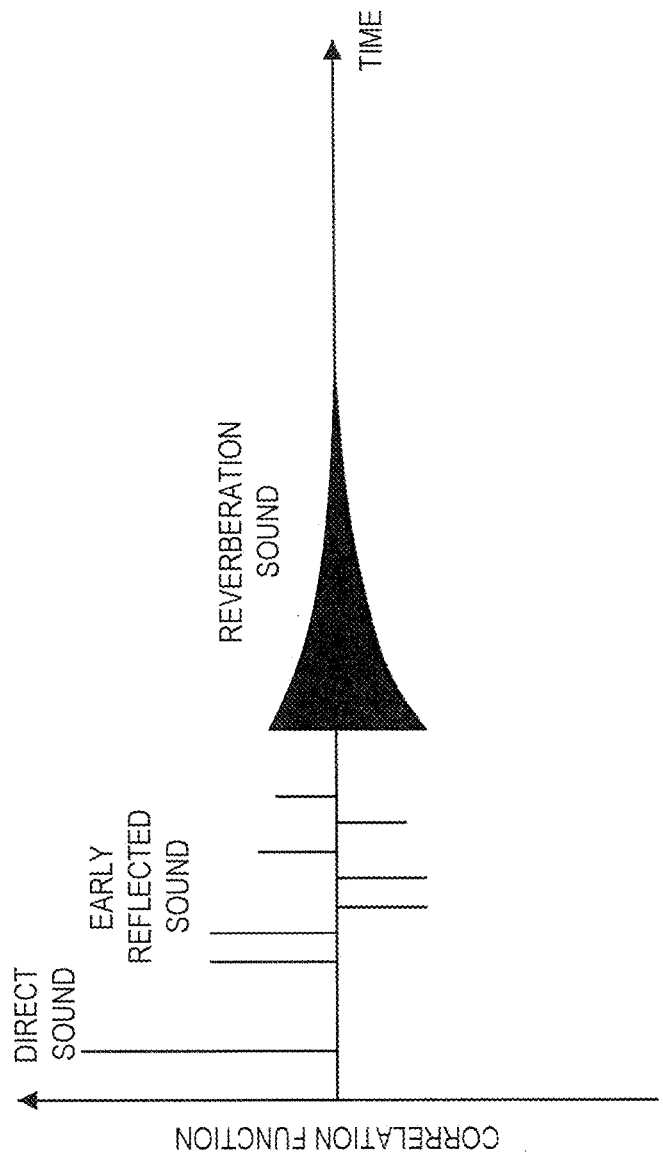
FIG. 11 is a schematic diagram illustrating an example of a correlation function that can be acquired by a listening environment characteristic information acquiring unit.
Figure 12:
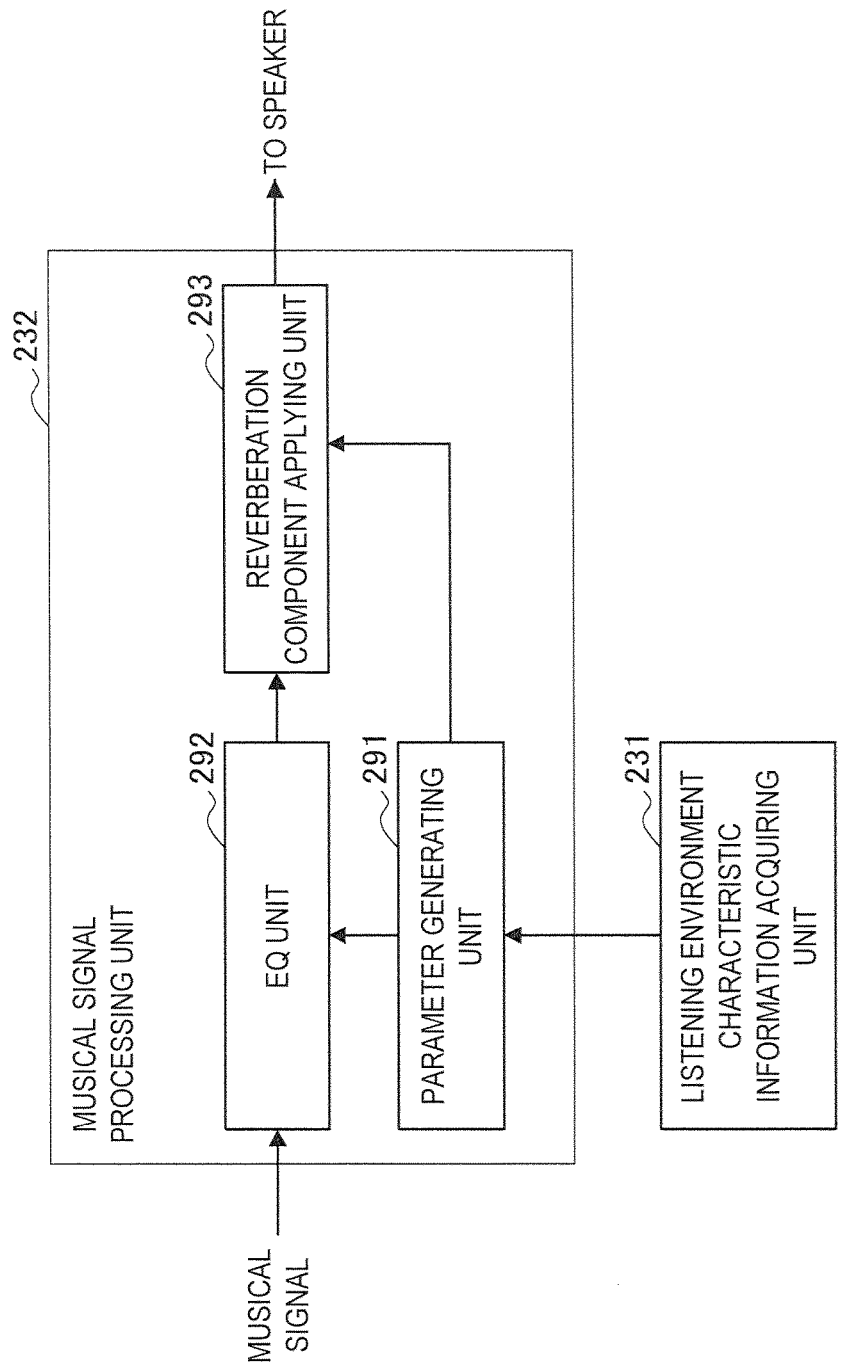
FIG. 12 is a block diagram illustrating an example of a functional configuration of a musical signal processing unit.
Figure 13:
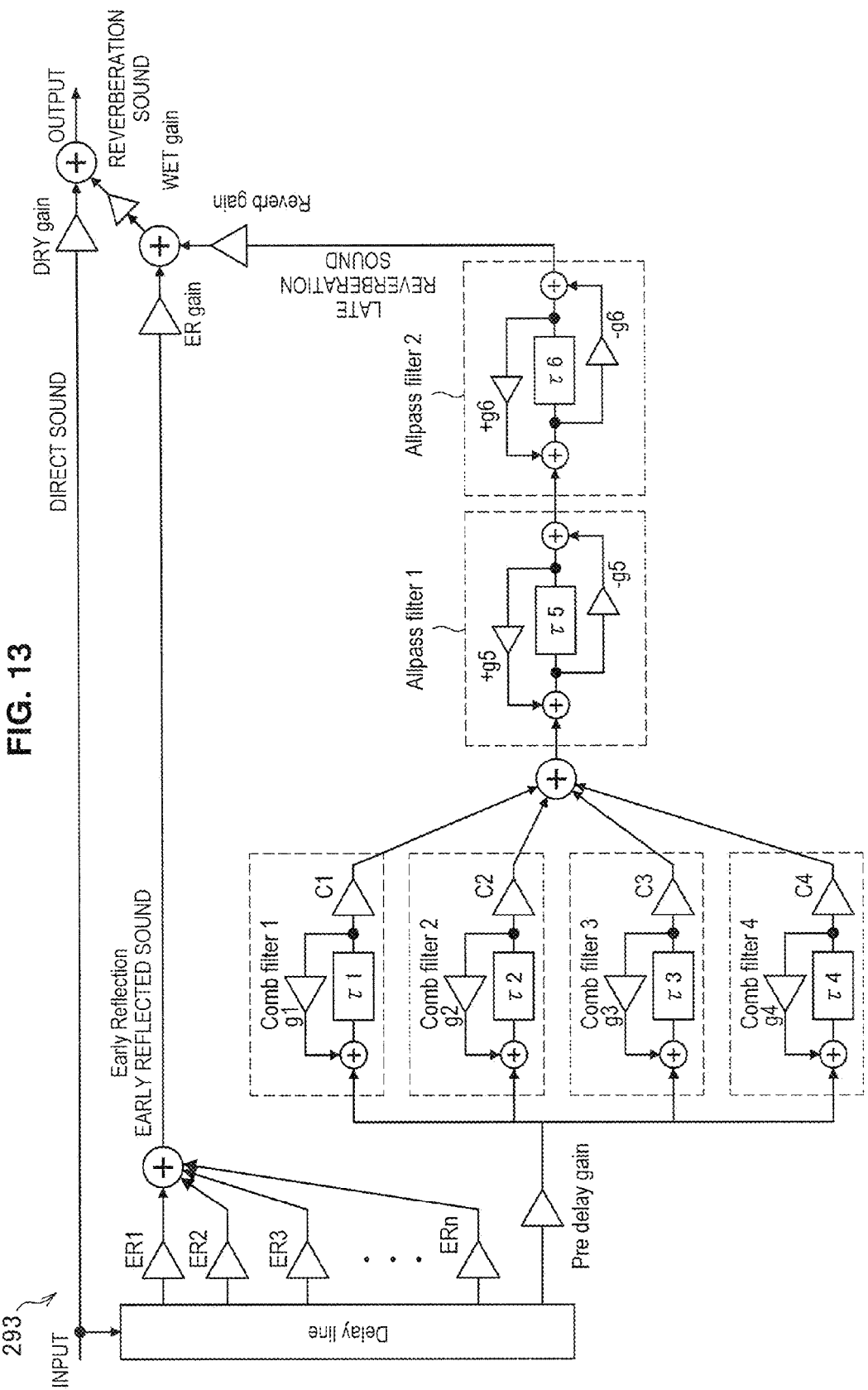
FIG. 13 is a block diagram illustrating an exemplary configuration of a reverberation component applying unit included in a musical signal processing unit.

A function of the musical signal processing unit 232 illustrated in FIG. 6 will be described with reference to FIGS. 11 to 13. FIG. 11 is a schematic diagram illustrating an example of a correlation function that can be acquired by the listening environment characteristic information acquiring unit 231. FIG. 12 is a block diagram illustrating an example of a functional configuration of the musical signal processing unit 232. FIG. 13 is a block diagram illustrating an exemplary configuration of a reverberation component applying unit 293 included in the musical signal processing unit 232.

Here, an example in which the musical signal processing unit 232 estimates a reverberation period of time, an early reflection period of time, a proportion of a reverberation sound, a frequency characteristic, and the like and generates parameters based on the correlation function acquired by the method described in (2-3-2. Configuration of acquiring correlation function using musical signal as measurement signal) or (2-3-3. Configuration of acquiring correlation function using uncorrelated noise as the measurement signal), and reflects the characteristics in a musical signal will be described as an example of the function of the musical signal processing unit 232 according to the second embodiment. However, the second embodiment is not limited to this example, and the musical signal processing unit 232 may be configured to have any other function. For example, the musical signal processing unit 232 may estimate characteristics and generate parameters based on the transfer function $H_2$ acquired by the method described in (2-3-1. Configuration of acquiring transfer function using musical signal as measurement signal) and reflect the characteristics in a musical signal. Further, for example, the musical signal processing unit 232 may be configured with an FIR filter, similarly to the musical signal processing unit 132 according to the first embodiment described in (1-4. Musical signal processing unit) or may perform filtering on a musical signal using the FIR filter based on the transfer function $H_2$ acquired by the method described in (2-3-1. Configuration of acquiring transfer function using musical signal as measurement signal). The musical signal processing unit 132 according to the first embodiment may have a configuration illustrated in FIG. 12. In this case, the musical signal processing unit 132 may estimate characteristics and generate parameters based on the transfer function $H_2$ acquired by the method described in the first embodiment and reflect the characteristics in a musical signal using the configuration illustrated in FIG. 12.

As described in (2-3-2. Configuration of acquiring correlation function using musical signal as measurement signal), it is possible to estimate a reverberation characteristic of a listening environment such as a reverberation period of time or an early reflection period of time using an acquired correlation function. FIG. 11 illustrates an example in which the correlation function illustrated in FIG. 9 is further measured for a long time. As illustrated in FIG. 11, a component corresponding to a direct sound, a component corresponding to an early reflected sound, and a component corresponding to a reverberation sound can be observed from the correlation function measured by the listening environment characteristic information acquiring unit 231. The musical signal processing unit 232 estimates various kinds of acoustic characteristics such as a reverberation period of time, an early reflection period of time, a proportion of a reverberation sound (a late reverberation sound), and a frequency characteristic and generates parameters based on the characteristics of the correlation function.

FIG. 12 illustrates an example of a functional configuration of the musical signal processing unit 232 according to the second embodiment. Referring to FIG. 12, the musical signal processing unit 232 has functions such as a parameter generating unit 291, an EQ unit 292, and the reverberation component applying unit 293. In FIG. 12, a functional configuration of the musical signal processing unit 232 is illustrated, and it is illustrated together with an extracted configuration related to the functions of the musical signal processing unit 232 in the configuration of the acoustic adjustment system 20 illustrated in FIG. 6.

The parameter generating unit 291 generates parameters indicating various kinds of acoustic characteristics such as a reverberation period of time, an early reflection period of time, a proportion of a late reverberation sound, and a frequency characteristic based on the correlation function measured by the listening environment characteristic information acquiring unit 231. The EQ unit 292 is configured with, for example, an equalizer, and adjusts a frequency characteristic of a musical signal based on the parameter related to the frequency characteristic generated based on the correlation function from the parameter generating unit 291. The reverberation component applying unit 293 is configured with, for example, an infinite impulse response (IIR) filter illustrated in FIG. 13 and applies a reverberation characteristic of a listening environment to the musical signal based on the parameters related to the reverberation period of time, the early reflection period of time, and the proportion of the late reverberation sound generated by the parameter generating unit 291 based on the correlation function.

FIG. 13 illustrates an exemplary configuration of an IIR filter that can constitute the reverberation component applying unit 293. For example, a parameter related to the early reflection period of time generated based on the correlation function may be reflected in a length of a delay line and a coefficient ER (ER1 to ERn) of an amplifier illustrated in FIG. 13. For example, the parameter related to the reverberation period of time generated based on the correlation function may be reflected in a coefficient g (g1 to g4) and a coefficient $\tau$ ($\tau1$ to $\tau4$) in a comb filter (a comb filter 1 to a comb filter 4) illustrated in FIG. 13. For example, a parameter related to the proportion of the late reverberation sound generated based on the correlation function may be reflected in a DRY gain, an ER gain, a Reverb gain, a WET gain, and the like illustrated in FIG. 13. As described above, the IIR filter in which various kinds of parameters are reflected operates on the musical signal, and the acoustic characteristic of the listening environment such as the reverberation is applied to a pseudo-musical signal.

In the second embodiment, similarly to the first embodiment, when newly obtained parameters applied to the EQ unit 292 and the IIR filter are not too different from current setting values, the parameters are not updated in the EQ unit 292 and the IIR filter. For example, the parameter generating unit 291 may update the parameters when a difference between current parameters set in the EQ unit 292 and the IIR filter and new parameters obtained by a current measurement is larger than a predetermined threshold value. As described above, when a newly obtained parameter is not too different from the current setting value, the parameter is not updated, and thus a situation in which the characteristics of the EQ unit 292 and the IIR filter are frequently changed is prevented, and music can be more stably provided to the user.

The parameters generated by the parameter generating unit 291 based on the correlation function will be described in detail.

(Parameter Related to Early Reflection Period of Time)

An early reflection period of time may be set as a period of time T1 (for example, $t_2$ to $t_1$ illustrated in FIG. 9) between an initial peak (a direct sound) of a correlation function and a next peak of the correlation function. For example, when a listening environment is a relatively large indoor space such as a music hall, the early reflection period of time is considered to be relatively long. The parameter generating unit 291 obtains the early reflection period of time T1 based on the correlation function and provides the early reflection period of time T1 to the reverberation component applying unit 293. The reverberation component applying unit 293 changes a length of a delay line and the coefficient ER illustrated in FIG. 13 according to the early reflection period of time T1. Accordingly, a characteristic of the early reflection period of time of the listening environment can be reflected in a musical signal. A value obtained based on the correlation function or an impulse response is directly used as the coefficient ER, but several types of values that can be applied as the coefficient ER may be prepared in advance, and a value close to the characteristic obtained based on the correlation function may be selected from the prepared values and used.

(Parameter Related to Reverberation Period of Time)

A reverberation period of time Tr may be estimated by performing Schroder integration on an obtained correlation function and obtaining an energy attenuation curve. An example of the Schroder integration is indicated in the following Formula (6). Here, $\langle S^2(t) \rangle$ is an ensemble means of a reverberation waveform, and h(t) is the correlation function or an impulse response acquired by the listening environment characteristic information acquiring unit 231.

[Math. 6]

$$\langle S^2(t) \rangle = \int_t^\infty h^2(t)dt = \int_0^\infty h^2(t)dt - \int_0^t h^2(t)dt \tag{6}$$

Figure 14:
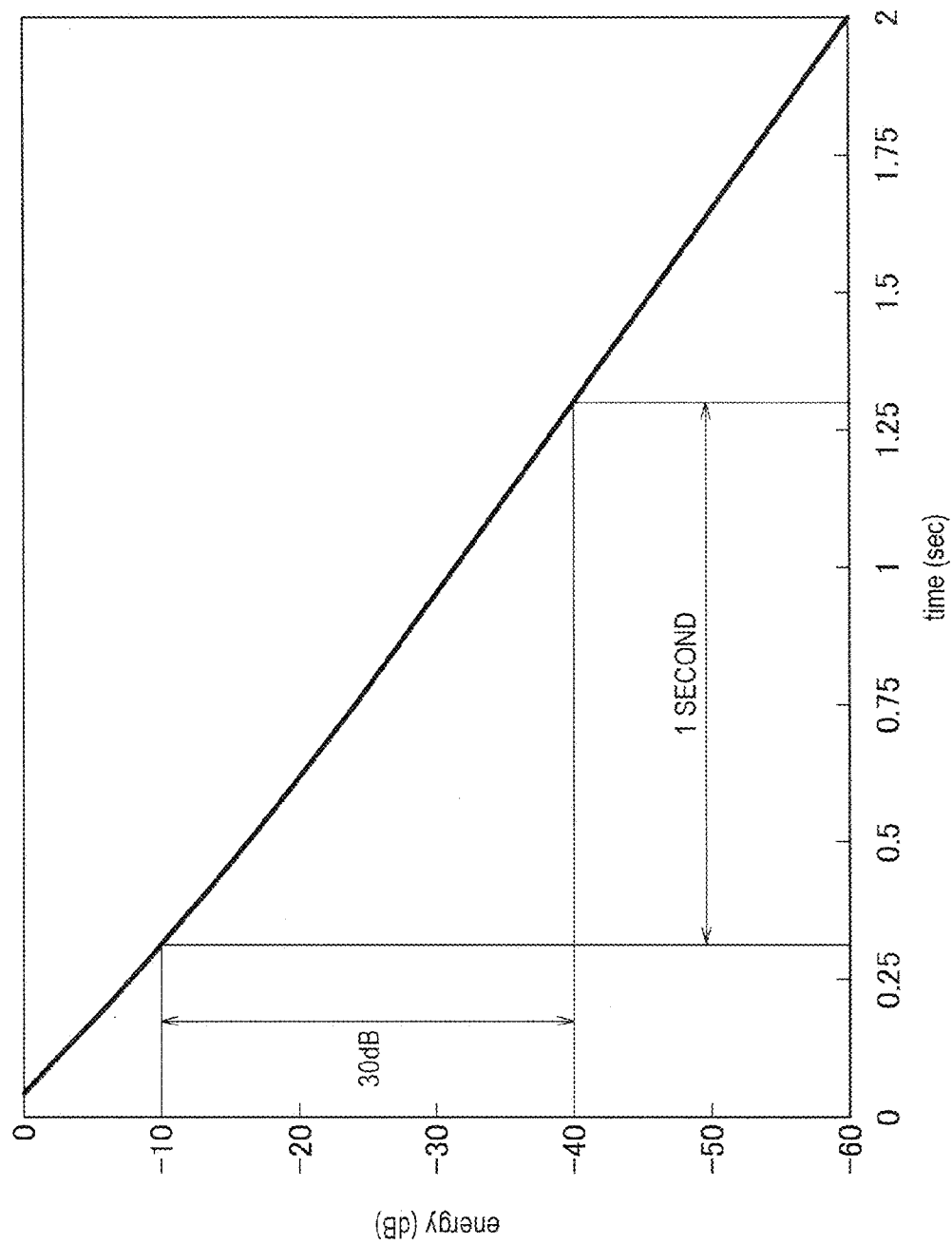
FIG. 14 is a diagram illustrating an example of an energy attenuation curve of a reverberation component.

The parameter generating unit 291 can obtain the energy attenuation curve of a reverberation component by performing the calculation indicated in Formula (6). An example of the energy attenuation curve of the reverberation component calculated by the parameter generating unit 291 is illustrated in FIG. 14. FIG. 14 is a diagram illustrating an example of the energy attenuation curve of the reverberation component.

Here, generally, the reverberation period of time Tr is defined as a period of time taken until energy of a sound becomes −60 (dB) in a measurement environment. In the example illustrated in FIG. 14, since energy is lowered by −30 (dB) for 1 (sec) (that is, the energy attenuation curve has an inclination of −30 (dB/sec)), the estimated reverberation period of time Tr is 2 (sec). For example, when a listening environment is a relatively large indoor space such as a music hall, the reverberation period of time is considered to be relatively long.

The reverberation component applying unit 293 at a subsequent stage changes a delay or a gain in the filter according to the reverberation period of time Tr obtained by the parameter generating unit 291. For example, in the case of the IIR filter illustrated in FIG. 13, the coefficient g and the coefficient τ in the comb filter can be changed using the reverberation period of time Tr. The parameter generating unit 291 can calculate the coefficient g and the coefficient τ in the comb filter based on the reverberation period of time Tr obtained based on the correlation function. Here, the coefficient g and the coefficient τ have a relation indicated in the following Formula (7) with the reverberation period of time Tr.

[Math. 7]

$$Tr = \frac{-3}{\log_{10}|g|}\tau \tag{7}$$

In the above example, since the reverberation period of time Tr is 2 (sec), the parameter generating unit 291 preferably calculates a combination of the coefficient g and the coefficient τ at which the left side of Formula (7) is 2 as a coefficient applied to the comb filters. Here, an example in which the coefficient τ is fixed and only the coefficient g is changed will be described as an example. The coefficient g of each comb filter is a value satisfying the following Formula (8) in view of Formula (7).

[Math. 8]

$$g = 10^{\frac{-3\tau}{Tr}} \tag{8}$$

The parameter generating unit 291 can calculate the coefficient g by substituting Tr=2 (sec) into Formula (8) and substituting a value of the coefficient τ set as the fixed value in each comb filter. The parameter generating unit 291 provides the coefficient g obtained as described above and the coefficient τ set as a fixed value to the reverberation component applying unit 293. The reverberation component applying unit 293 can reflect the characteristic of the reverberation period of time of the listening environment in a musical signal by applying the values calculated by the parameter generating unit 291 as the coefficient g and the coefficient τ in the comb filter illustrated in FIG. 13.

(Parameter Related to Proportion of the Late Reverberation Sound)

As an index of a proportion of a late reverberation sound, for example, there is a D value. The D value is a value indicating a proportion of early energy (within 50 ms) to energy of the entire sound and indicated by the following Formula (9). Here, h(t) is the correlation function or the impulse response acquired by the listening environment characteristic information acquiring unit 231.

[Math. 9]

$$D = \frac{\int_0^{50ms} h^2(t)dt}{\int_0^\infty h^2(t)dt} \tag{9}$$

A proportion of a late reverberation sound of a listening environment can be reflected in a musical signal by appropriately adjusting the characteristics such as the DRY gain, the ER gain, the Reverb gain, and the WET gain illustrated in FIG. 13 so that a value indicating a ratio of an early energy and the entire energy of a reverberation obtained as a measurement result such as the D value is associated with an early component and a late reverberation component of a reverberation applied by the IIR filter. The parameter generating unit 291 can calculate the D value using Formula (9), and can calculate the parameters related to the characteristics such as the DRY gain, the ER gain, the Reverb gain, and the WET gain satisfying the above condition. The parameter generating unit 291 provides the parameters obtained as described above to the reverberation component applying unit 293. The reverberation component applying unit 293 can reflect a characteristic of the proportion of the late reverberation sound of the listening environment in a musical signal by applying the parameters calculated by the parameter generating unit 291 to the DRY gain, the ER gain, the Reverb gain, the WET gain, and the like illustrated in FIG. 13.

(Parameter Related to Frequency Characteristic)

The parameter generating unit 291 can estimate a frequency characteristic of a listening environment based on the correlation function acquired by the listening environment characteristic information acquiring unit 231, generate a parameter in which the frequency characteristic can be reflected, and provide the generated parameter to the EQ unit 292. The EQ unit 292 reflects the frequency characteristic of the listening environment in a musical signal. For example, when attenuation of a high frequency appears in the estimated frequency characteristic of the listening environment, the EQ unit 292 may perform a process of attenuating a high frequency of the musical signal.

Here, generally, the frequency characteristic of music radiated into space varies according to a transfer function of the space. Thus, for example, it is also possible to acquire a frequency characteristic of a listening environment based on the transfer function $H_2$ acquired by the method described in (2-3-1. Configuration of acquiring transfer function using musical signal as measurement signal) and reflect the frequency characteristic in a musical signal using the IIR filter illustrated in FIG. 13. In this case, for example, the parameter generating unit 291 can obtain a parameter for reflecting a frequency amplitude characteristic in the IIR filter by performing a Fourier transform on the transfer function $H_2$. It is possible to apply a frequency characteristic further simulating the characteristic of the listening environment to the musical signal by appropriately setting the parameter acquired by the parameter generating unit 291 in the IIR filter. Similarly to the first embodiment, it is possible to apply the frequency characteristic to the musical signal by performing convolution on the musical signal using the FIR filter illustrated in FIG. 4 based on the transfer function $H_2$ acquired by the method described in (2-3-1. Configuration of acquiring transfer function using musical signal as measurement signal).

The function of the musical signal processing unit 232 according to the second embodiment has been described above. A value close to the calculated value may be selected as the parameter applied to the EQ unit 292 and/or the IIR filter from several values that are prepared in advance instead of using the value calculated based on the transfer function and/or the correlation function without change. For example, listening environments may be classified into several categories that can be assumed in advance such as a small room and a music hall, and a parameter according to the category may be prepared for each category. The parameters or a relation between the category and the parameter may be stored in, for example, a storage unit (not illustrated in FIG. 6) installed in the acoustic adjustment system 20 as a table. The parameter generating unit 291 decides the category corresponding to a listening environment according to a characteristic of a transfer function and/or the correlation function acquired by the listening environment characteristic information acquiring unit 231. Further, the parameter generating unit 291 may select the parameter according to the listening environment with reference to the table indicating the relation between the category and the parameter stored in the storage unit.

The second embodiment has been described above. As described above, according to the second embodiment, a transfer function and/or a correlation function of a listening space is acquired based on a predetermined measurement sound, and an acoustic characteristic of the listening space is applied to a musical signal based on the transfer function and/or the correlation function. Thus, music having a feeling of more openness that is more harmonious with an external sound can be provided to the user. Various sounds such as the musical signal or a noisy sound may be used as the measurement sound. Thus, for example, in an environment in which it is difficult to output music toward the outside, listening environment characteristic information can be acquired using an appropriate measurement sound according to the listening environment, for example, using a noisy sound or a measurement sound of a non-audible band, and the measurement can be performed in various listening environments.

3. Information Processing Method

Figure 15:
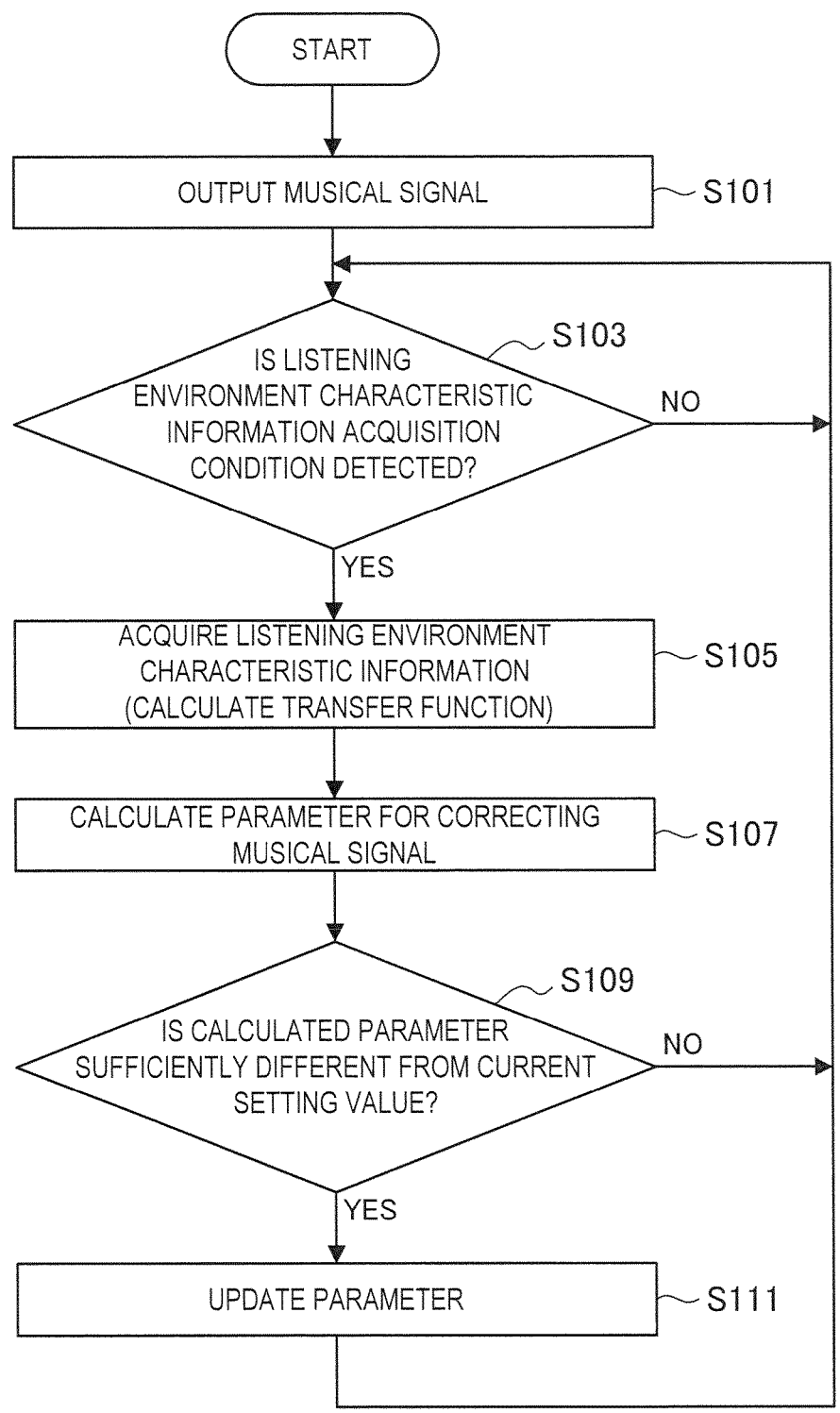
FIG. 15 is a flowchart illustrating an example of a procedure of an information processing method according to the first and second embodiments.

Next, an information processing method according to the first and second embodiments described above will be described with reference to FIG. 15. FIG. 15 is a flowchart illustrating an example of a procedure of the information processing method according to the first and second embodiments. Here, as an example of the information processing method according to the first and second embodiments, an information processing method when the transfer function $H_2$ is acquired as listening environment characteristic information using a musical signal as a measurement signal, which can be performed in the acoustic adjustment system 20 according to the second embodiment including the listening environment characteristic information acquiring unit 231a described in (2-3-1. Configuration of acquiring transfer function using musical signal as measurement signal), will be described. However, the information processing method according to the first and second embodiments are not limited to this example, and as described in the first and second embodiments, a spoken voice of a user or an uncorrelated noise may be used as the measurement signal, and a correlation function may be acquired as the listening environment characteristic information.

Referring to FIG. 15, in the information processing method according to the second embodiment, first, a musical signal is output toward a listening environment (step S101). For example, the process of step S101 may be performed as the speaker 220a is driven according to control from the control unit 230 illustrated in FIG. 6. As described in (1. First embodiment) and (2-3-3. Configuration of acquiring correlation function using uncorrelated noise as the measurement signal), when the musical signal is not used as a measurement signal, the process of step S101 may be omitted.

Next, it is determined whether a listening environment characteristic information acquisition condition is detected (step S103). The process of step S103 and step S105, which will be described later, may be performed by, for example, the listening environment characteristic information acquiring unit 231 illustrated in FIG. 6. In the case of the first embodiment, the process of steps S103 and S105 may be performed by, for example, the listening environment characteristic information acquiring unit 131 illustrated in FIG. 2. As the listening environment characteristic information acquisition condition, for example, a power supply to the control unit 230, a specified timer count, or the like may be detected. When a processor constituting the control unit 230 is mounted in a mobile terminal that is separate from the headphone 200, the listening environment characteristic information acquisition condition may include, for example, detection of movement of the user by a sensor mounted in the mobile terminal or detection of an operation input on the mobile terminal. In the first embodiment, since the listening environment characteristic information is acquired based on the spoken voice of the user, the user's utterance may be detected as the listening environment characteristic information acquisition condition.

When the listening environment characteristic information acquisition condition is determined not to be detected in step S103, the process does not proceed to a next step and is on standby until the listening environment characteristic information acquisition condition is detected. On the other hand, when the listening environment characteristic information acquisition condition is determined to be detected in step S103, the process proceeds to step S105.

In step S105, listening environment characteristic information is acquired. In the process of step S105, for example, the transfer function $H_2$ of the listening environment is calculated based on a collection signal of the microphone 210 according to the musical signal output in step S101 using the technique described in (2-3-1. Configuration of acquiring transfer function using musical signal as measurement signal). In the case of the first embodiment, in the process of step S105, the transfer function $H_2$ of the listening environment is calculated based on the collection signal of the microphone 110 according to the spoken voice of the user. As described in (2-3-2. Configuration of acquiring correlation function using musical signal as measurement signal) and (2-3-3. Configuration of acquiring correlation function using uncorrelated noise as the measurement signal), the correlation function may be acquired as the listening environment characteristic information.

Then, a parameter for correcting the musical signal is calculated based on the acquired listening environment characteristic information (step S107). The process of step S107 and steps S109 and S111, which will be described later, may be performed by, for example, the musical signal processing unit 232 illustrated in FIG. 6. In the process of step S107, for example, as described in (2-4. Musical signal processing unit), a parameter for deciding characteristics of the EQ unit 292 and the reverberation component applying unit 293 illustrated in FIG. 12 (that is, the IIR filter) are calculated. In the case of the first embodiment, the process of steps S107, S109, and S111 may be performed by, for example, the musical signal processing unit 132 illustrated in FIG. 2. In the first embodiment, in the process of step S107, for example, as described in (1-4. Musical signal processing unit), a parameter for deciding the characteristic of the FIR filter illustrated in FIG. 4 is calculated.

Then, it is determined whether or not the calculated parameter is sufficiently different from a current setting value (step S109). In the process of step S109, for example, a difference between the current parameter set in the EQ unit 292 and/or the IIR filter and a new parameter obtained by a current measurement is compared with a predetermined threshold value. In the case of the first embodiment, a similar process is performed in the FIR filter.

When the calculated parameter is determined not to be too different from the current setting value in step S109, the process does not proceed to a next step and returns to step S103. When the characteristic of the EQ unit 292, the IIR filter, or the FIR filter is frequently changed, the musical signal wobbles, and a feeling of listening of the user is likely to be damaged. On the other hand, when the calculated parameter is determined to be sufficiently different from the current setting value in step S109, the process proceeds to step S111.

In step S111, the parameter of the EQ unit 292 and/or the IIR filter is updated using the parameter calculated in step S107. Accordingly, an acoustic characteristic of the listening environment is reflected in the musical signal through the EQ unit 292 and/or the IIR filter. In the case of the first embodiment, the parameter of the FIR filter is updated using the parameter calculated in step S107, and the acoustic characteristic of the listening environment is reflected in the musical signal through the FIR filter.

The information processing method according to the first and second embodiments has been described above with reference to FIG. 15.

4. Modified Examples

Next, several modified examples of the first and second embodiments described above will be described. In the following description, a modified example of the first embodiment will be described as an example, but a configuration according to the modified example to be described below can be similarly applied to the second embodiment.

(4-1. Modified Example in which Acoustic Pressure is Adjusted)

In the first and second embodiments described above, for example, a reverberation characteristic or a frequency characteristic of a listening environment is applied to a musical signal as an acoustic characteristic of the listening environment. However, the first and second embodiments are not limited to this example, and any other acoustic characteristic of the listening environment may be applied to the musical signal. Here, a modified example in which acoustic pressure of a musical signal is adjusted according to a listening environment will be described as an example.

Figure 16:
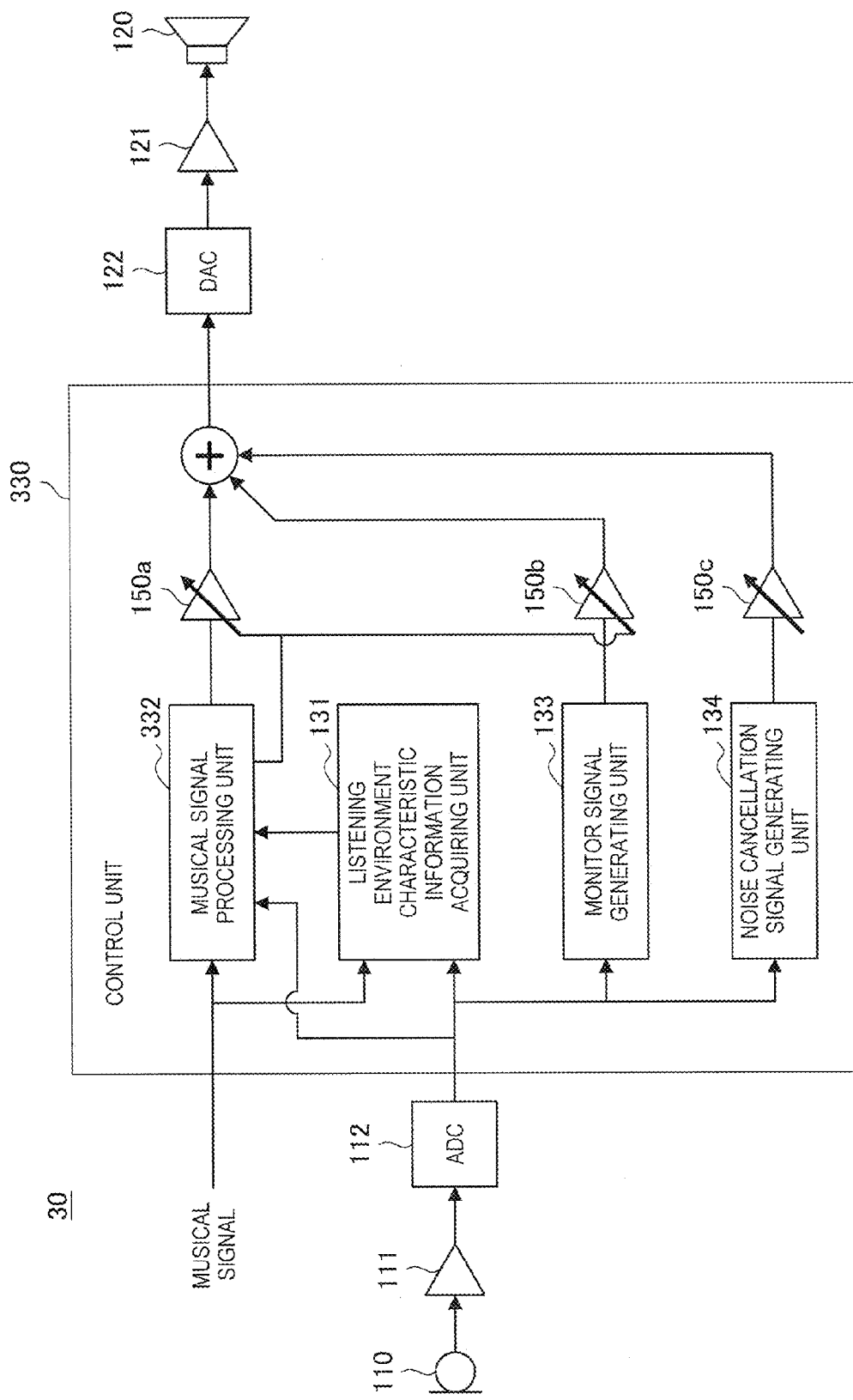
FIG. 16 is a block diagram illustrating an exemplary configuration of an acoustic adjustment system according to a modified example in which acoustic pressure is adjusted.
Figure 17:
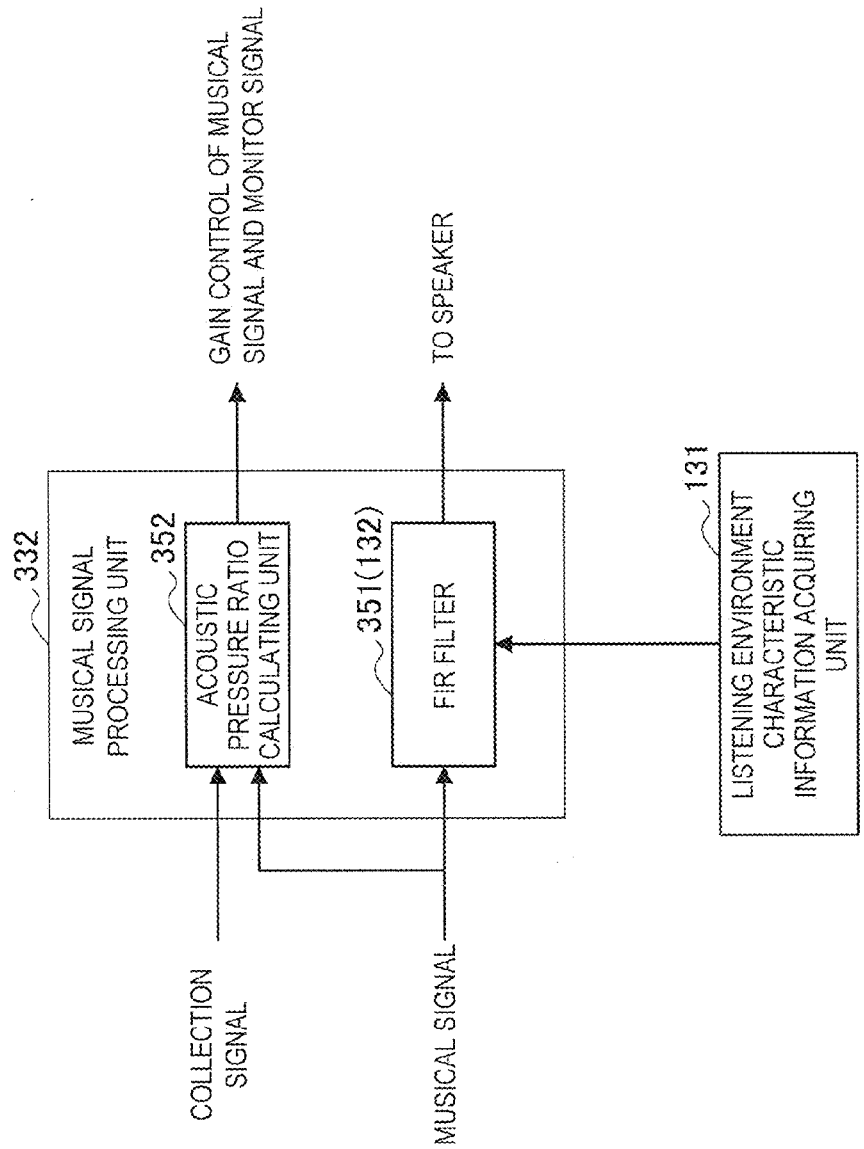
FIG. 17 is a block diagram illustrating an example of a functional configuration of a musical signal processing unit according to a modified example in which acoustic pressure is adjusted.

A configuration of an acoustic adjustment system according to the present modified example will be described with reference to FIGS. 16 and 17. FIG. 16 is a block diagram illustrating an exemplary configuration of the acoustic adjustment system according to the modified example in which acoustic pressure is adjusted. FIG. 17 is a block diagram illustrating an example of a functional configuration of a musical signal processing unit according to the modified example in which the acoustic pressure is adjusted. The acoustic adjustment system illustrated in FIG. 16 differs from the acoustic adjustment system 10 illustrated in FIG. 2 according to the first embodiment in that the function of the musical signal processing unit 132 is changed, and the functions of the remaining components are similar to those of the acoustic adjustment system 10. Thus, the following description of the acoustic adjustment system according to the present modified example will proceed with a difference with the acoustic adjustment system 10 according to the first embodiment, and a detailed description of duplicated matters will be omitted.

Referring to FIG. 16, an acoustic adjustment system 30 according to the present modified example includes a microphone 110, a speaker 120, and a control unit 330 Here, since the functions of the microphone 110 and the speaker 120 are similar to the functions of the corresponding components illustrated in FIG. 1, a detailed description thereof will be omitted.

The control unit 330 is configured with various kinds of processors such as a CPU or a DSP, and performs various kinds of signal processing performed in the acoustic adjustment system 30. The control unit 330 has functions such as a listening environment characteristic information acquiring unit 131, a musical signal processing unit 332, a monitor signal generating unit 133, and a noise cancellation signal generating unit 134. The functions of the control unit 330 may be performed as a processor constituting the control unit 330 operates according to a predetermined program. Here, since the functions of the listening environment characteristic information acquiring unit 131, the monitor signal generating unit 133, and the noise cancellation signal generating unit 134 are similar to the functions of the corresponding components illustrated in FIG. 1, a detailed description thereof will be omitted.

As the difference with the first embodiment, a collection signal obtained by the microphone 110 is input to the musical signal processing unit 332 together with a musical signal in the present modified example, as illustrated in FIG. 16. Further, gains of the variable amplifier 150a installed for the musical signal and the variable amplifier 150b installed for the monitor signal are adjusted according to an acoustic pressure ratio of the acoustic pressure of the sound related to the musical signal calculated by the musical signal processing unit 332 and the acoustic pressure of the external sound.

FIG. 17 illustrates an example of a functional configuration of the musical signal processing unit 332. Referring to FIG. 17, the musical signal processing unit 332 has functions such as an FIR filter 351 and an acoustic pressure ratio calculating unit 352. In FIG. 17, a functional configuration of the musical signal processing unit 332 is illustrated, and it is illustrated together with an extracted configuration related to the functions of the musical signal processing unit 332 in the acoustic adjustment system 30 illustrated in FIG. 16.

The FIR filter 351 corresponds to the FIR filter according to the first embodiment illustrated in FIG. 4 (that is, the musical signal processing unit 132 illustrated in FIG. 2). Since a function of the FIR filter 351 is similar to the function of the FIR filter according to the first embodiment (the musical signal processing unit 132), a detailed description thereof will be omitted. As described above, the musical signal processing unit 332 according to the present modified example can be understood as having both the function of the musical signal processing unit 132 according to the first embodiment and the function of the acoustic pressure ratio calculating unit 352.

The acoustic pressure ratio calculating unit 352 analyzes the acoustic pressure of the musical signal and the acoustic pressure of the collection signal (that is, the acoustic pressure of the external sound), and calculates the acoustic pressure of the musical signal and the acoustic pressure of the signal (that is, the monitor signal) related to the external signal so that the acoustic pressure ratio of the acoustic pressure of the sound related to the musical signal and the acoustic pressure of the external sound (that is, the monitor sound) has an appropriate value. For example, when the external sound is excessively large, both acoustic pressures are calculated so that the acoustic pressure of the external sound is relatively decreased. In this case, the acoustic pressure of the musical signal may be increased, or the acoustic pressure of the monitor signal may be decreased. Accordingly, a situation in which music is buried by the external sound is prevented. For example, when the sound related to the musical signal is excessively large, the acoustic pressure ratio is calculated so that the acoustic pressure of the sound related to the musical signal is relatively reduced. In this case, the acoustic pressure of the musical signal may be decreased, or the acoustic pressure of the monitor signal may be increased. Accordingly, a situation in which music leaks outside of the headphone 100 is prevented. As a value of the acoustic pressure ratio, for example, a designer of the acoustic adjustment system 40 may set an appropriate value in advance, or the user may appropriately set a value according to circumstances.

The parameter calculated by the acoustic pressure ratio calculating unit 352 is reflected in the gains of the variable amplifier 150a installed for the musical signal and the variable amplifier 150b installed for the monitor signal. Accordingly, the acoustic pressure ratio of the musical signal and the monitor signal corresponding to the external sound is appropriately controlled.

The configuration of the acoustic adjustment system according to the present modified example has been described above with reference to FIGS. 16 and 17. As described above, according to the present modified example, the acoustic pressure ratio of the sound related to the musical signal and the external sound is automatically adjusted to an appropriate value according to the external sound in the listening environment. Thus, the music and the external sound are provided to the user with a more comfortable volume balance, and thus the convenience of the user can be improved.

In the above description, the acoustic pressure of the external sound is calculated by the acoustic pressure ratio calculating unit 352 of the musical signal processing unit 332, but the present modified example is not limited to this example. The acoustic pressure of the external sound may be calculated as part of the listening environment characteristic information as the collection signal is analyzed by the listening environment characteristic information acquiring unit 131.

(4-2. Modified Example in which Listening Environment Characteristic Information Stored in DB is Used)

In the first and second embodiments described above, the listening environment characteristic information is acquired based on the external sound collected by the microphones 110 and 210 each time the listening environment characteristic information acquisition condition is detected. However, the first and second embodiments are not limited to this example, and for example, a correspondence between the listening environment characteristic information of each place (that is, each listening environment) and position information of the place may be stored as a database (DB), and the listening environment characteristic information acquiring unit may acquire the listening environment characteristic information of the place corresponding to the current position of the user from the DB.

Figure 18:
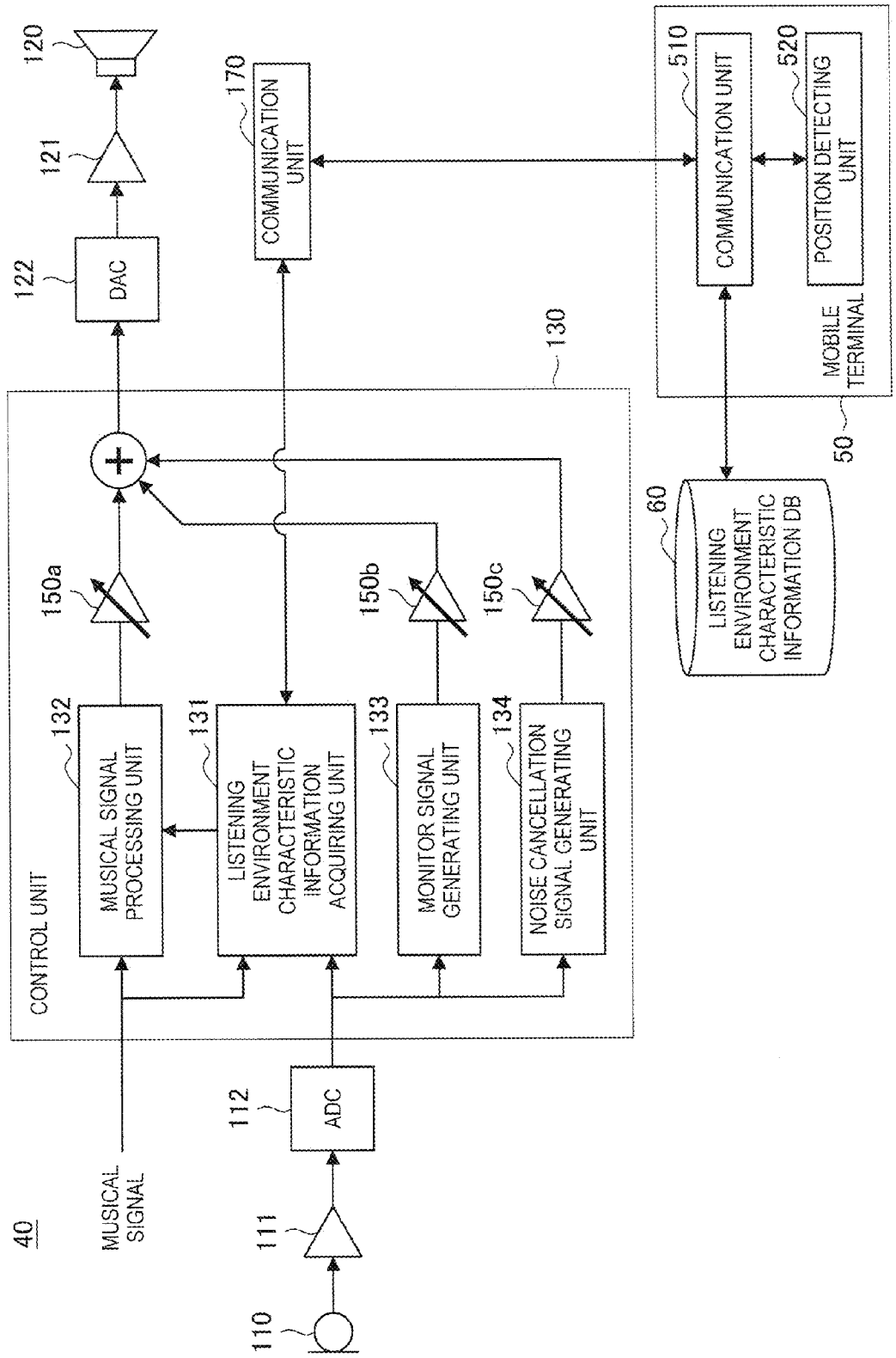
FIG. 18 is a block diagram illustrating an exemplary configuration of an acoustic adjustment system according to a modified example in which listening environment characteristic information stored in a DB is used.

A configuration of the acoustic adjustment system according to a modified example in which the listening environment characteristic information stored in the DB is used will be described with reference to FIG. 18. FIG. 18 is a block diagram illustrating an exemplary configuration of the acoustic adjustment system according to the present modified example. The acoustic adjustment system illustrated in FIG. 18 differs from the acoustic adjustment system 10 according to the first embodiment illustrated in FIG. 1 in that a communication unit 170, a mobile terminal 50, and a listening environment characteristic information DB 60, which will be described later, are added, and functions of the remaining components are similar to those of the acoustic adjustment system 10. Thus, the following description of the acoustic adjustment system according to the present modified example will proceed with a difference with the acoustic adjustment system 10 according to the first embodiment, and a detailed description of duplicated matters will be omitted.

Referring to FIG. 18, an acoustic adjustment system 40 according to the present modified example includes a microphone 110, a speaker 120, a control unit 130, a communication unit 170, a mobile terminal 50, and a listening environment characteristic information DB 60. Here, functions of the microphone 110, the speaker 120, and the control unit 130 are similar to the functions of the corresponding components illustrated in FIG. 1, and a detailed description thereof will be omitted.

The communication unit 170 is configured with a communication device capable of performing transmission and reception of various kinds of information with the external device. In the present modified example, for example, a communication device that can function as the communication unit 170 may be mounted in the headphone 100 illustrated in FIG. 1. The communication unit 170 can perform transmission and reception of various kinds of information with the mobile terminal 50. For example, communication between the communication unit 170 and the mobile terminal 50 may be wireless communication according to a communication scheme of Bluetooth (registered trademark) or may be wired communication. For example, the communication unit 170 transmits the listening environment characteristic information acquired based on the collection signal from the listening environment characteristic information acquiring unit 131 of the control unit 130 to the mobile terminal 50. For example, the communication unit 170 can receive the listening environment characteristic information of the place corresponding to the current position of the user from the mobile terminal 50 and provide the listening environment characteristic information to the listening environment characteristic information acquiring unit 131.

The mobile terminal 50 is an information processing device carried by the user such as a smart phone or a table personal computer (PC). The mobile terminal 50 has functions such as a communication unit 510 and a position detecting unit 520. Although not illustrated for the sake of simplicity, the mobile terminal 50 may further have various kinds of functions provided by a mobile terminal such as a common smart phone or a tablet PC. For example, the mobile terminal 50 can be equipped with a component such as a control unit that controls an operation of the mobile terminal 50 that performs various kinds of signal processing or a storage unit that stores various kinds of information processed in the mobile terminal 50. Driving of the communication unit 510 and the position detecting unit 520 can be controlled as a processor constituting the control unit operates according to a predetermined program. As described in (1-2. Configuration of system), the control unit 130 may be implemented as a function of the mobile terminal 50.

The communication unit 510 is configured with a communication device capable of performing transmission and reception of various kinds of information with the external device. The communication unit 510 can perform transmission and reception of various kinds of information with the communication unit 170. In the present modified example, the communication unit 510 receives the listening environment characteristic information that is acquired based on the collection signal by the listening environment characteristic information acquiring unit 131 of the control unit 130 and transmitted from the communication unit 170. The communication unit 510 associates the received listening environment characteristic information with the position information detected by the position detecting unit 520 (this corresponds to the current position information of the mobile terminal 50, that is, the current position information of the user), and transmits the received listening environment characteristic information to the listening environment characteristic information DB 60. The communication unit 510 receives the listening environment characteristic information of the place corresponding to the current place of the user from the listening environment characteristic information stored in the listening environment characteristic information DB 60, and transmits the listening environment characteristic information to the communication unit 170.

The position detecting unit 520 is configured with a position detecting sensor such as a GPS sensor and detects a current position of the mobile terminal 50, that is, a current position of the user. The position detecting unit 520 provides the detected current position information of the user to the communication unit 510. Accordingly, as described above, the communication unit 510 can associate the listening environment characteristic information acquired based on the collection signal by the listening environment characteristic information acquiring unit 131 of the control unit 130 with the current position information of the user and transmit the listening environment characteristic information to the listening environment characteristic information DB 60.

For example, the listening environment characteristic information DB 60 is configured with a storage device capable of storing various kinds of information such as a magnetic storage unit device such as a hard disk drive (HDD), a semiconductor memory device, an optical memory device, or a magneto optical memory device. The listening environment characteristic information DB 60 associates the position information of the place (that is, the listening environment) with the listening environment characteristic information of the listening environment and manages the associated information. The listening environment characteristic information DB 60 may be installed on, for example, a network (on a so-called cloud), and the mobile terminal 50 may perform communication with the listening environment characteristic information DB 60 via a communication network constructed according to various kinds of communication schemes. As described in (1-2. Configuration of system), the control unit 130 may be implemented as a function of an information processing device such as a server installed on a cloud together with the listening environment characteristic information DB 60.

In the present modified example, for example, the listening environment characteristic information of all places acquired by a plurality of users are collected and stored in the listening environment characteristic information DB 60 as necessary. Then, when a certain user desires to listen to music in a certain place, the position detecting unit 520 detects the current position of the user and transmits the position information of the current position to the listening environment characteristic information DB 60. In the listening environment characteristic information DB 60, whether listening environment characteristic information of the place corresponding to the current position of the user is stored in the listening environment characteristic information DB 60 is searched for based on the position information. When the listening environment characteristic information of the place corresponding to the current position of the user is stored in the listening environment characteristic information DB 60, the listening environment characteristic information is transmitted from the listening environment characteristic information DB 60 to the listening environment characteristic information acquiring unit 131 of the control unit 130 through the communication units 170 and 510. The musical signal processing unit 132 can perform filtering of the musical signal using the listening environment characteristic information provided from the listening environment characteristic information acquiring unit 131 and apply the acoustic characteristic of the listening environment in which the user is currently located to the musical signal. As described above, in the present modified example, although a series of processes of collecting the external sound and acquiring the listening environment characteristic information based on the collected external sound is not performed, the listening environment characteristic information can be acquired based on a previous history. Thus, the process of calculating the transfer function, the correlation function, or the like can be omitted, and thus the configuration of the control unit 130 can be simplified.

The configuration of the acoustic adjustment system according to the present modified example has been described above with reference to FIG. 18. As described above, according to the present modified example, the listening environment characteristic information can be acquired with reference to the listening environment characteristic information DB 60 although a series of processes of collecting the external sound and acquiring the listening environment characteristic information based on the collected external sound is not performed. Thus, the process performed by the control unit 130 can be further simplified.

In the listening environment characteristic information DB 60, the parameter for deciding the characteristics of the EQ unit 292 and the reverberation component applying unit 293 (that is, the IIR filter) illustrated in FIG. 12 or the parameter for correcting the musical signal such as the parameter for deciding the characteristic of the FIR filter illustrated in FIG. 4 may be associated with information about the position information of the listening environment together with the transfer function or the correlation function and stored. Accordingly, the musical signal processing unit 132 can correct the musical signal using the parameter stored in the listening environment characteristic information DB 60 without calculating the parameter for correcting the musical signal. Thus, the process of calculating the parameter can be omitted, and the configuration of the control unit 130 can be further simplified.

Further, when a plurality of pieces of listening environment characteristic information are acquired in the same place by a plurality of users, a statistical value (for example, an average value or the like) of the listening environment characteristic information may be stored in the listening environment characteristic information DB 60 as the listening environment characteristic information of the place. Accordingly, accuracy of the listening environment characteristic information stored in the listening environment characteristic information DB 60 can be further improved.

Further, even when the listening environment characteristic information of a place corresponding to a current position of the user is stored in the listening environment characteristic information DB 60, the listening environment characteristic information acquiring unit 131 may newly acquire the listening environment characteristic information based on the external sound. Then, the listening environment characteristic information stored in the listening environment characteristic information DB 60 is compared with the newly acquired listening environment characteristic information, and when the values are different, the information in the listening environment characteristic information DB 60 may be updated, and filtering of the musical signal may be performed based on the newly acquired listening environment characteristic information. This is because the listening environment characteristic information may change with the change in the surrounding environment even in the same place, and thus the new listening environment characteristic information is considered to be higher in reliability.

(4-3. Modified Example in which Listening Environment Characteristic Information is Acquired by Each of Pair of Housings)

In the first and second embodiments described above, the listening environment characteristic information is acquired based on the collected sound obtained by the microphone 110 or 210 installed in one housing 140 or 240 of a pair of housings 140 and 240 constituting the headphone 100 or 200. However, by collecting the external sound and acquiring the listening environment characteristic information from each of the pair of housings 140 and 240, the listening environment characteristic information can be acquired with a higher degree of accuracy.

Figure 19:
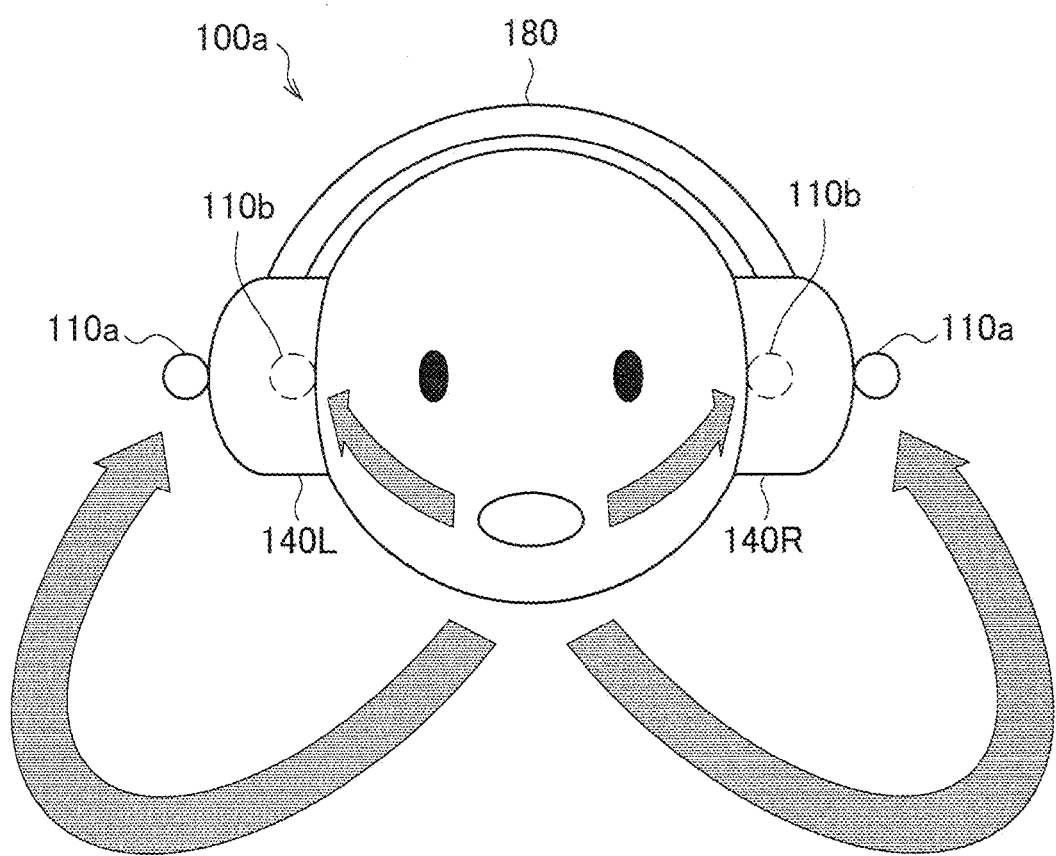
FIG. 19 is a schematic diagram illustrating an exemplary configuration of a headphone according to a modified example in which listening environment characteristic information is acquired by each of a pair of housings.
Figure 20:
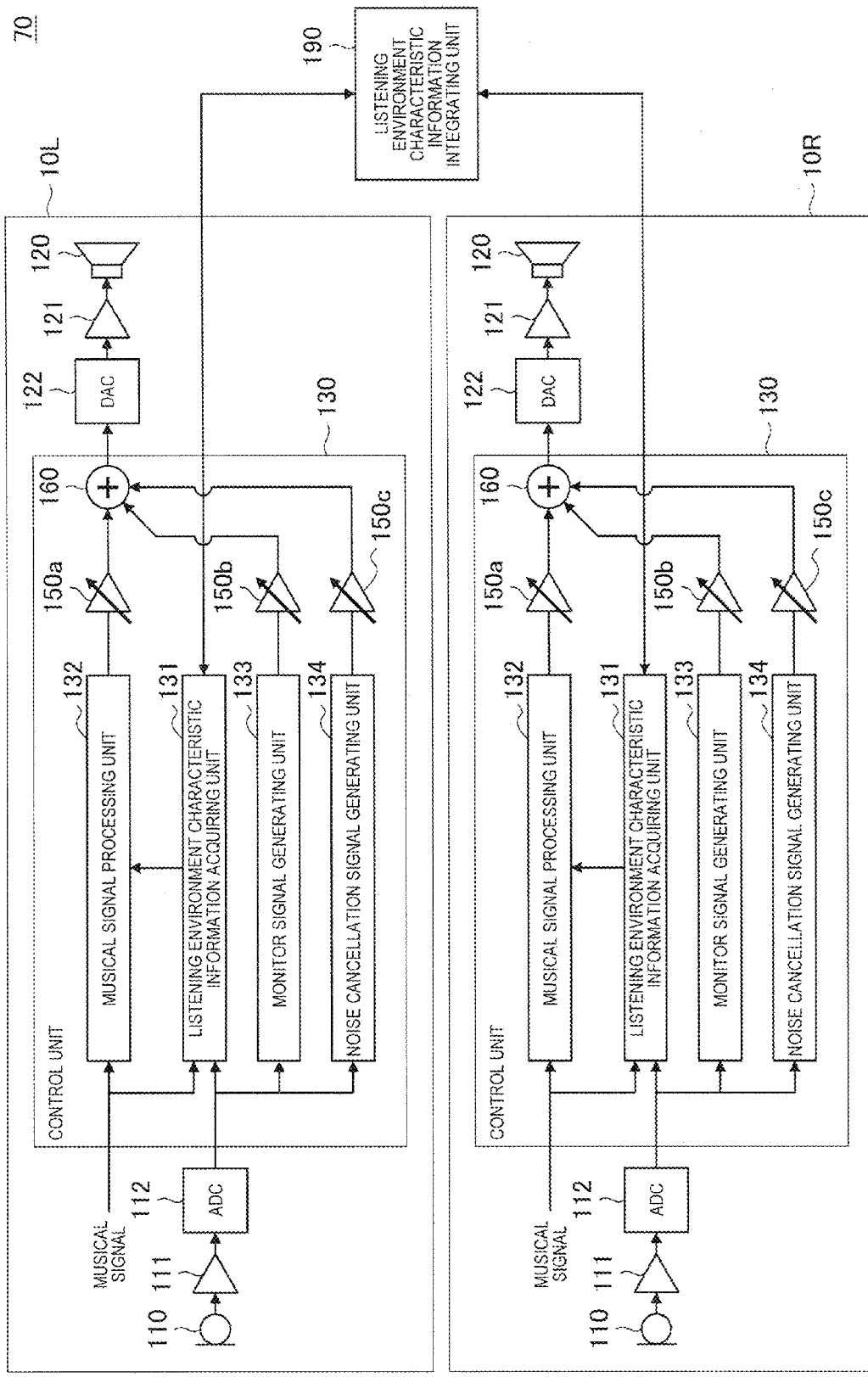
FIG. 20 is a block diagram illustrating an exemplary configuration of an acoustic adjustment system according to a modified example in which listening environment characteristic information is acquired by each of a pair of housings.

A modified example in which the listening environment characteristic information is acquired by each of a pair of housings will be described with reference to FIGS. 19 and 20. FIG. 19 is a schematic diagram illustrating an exemplary configuration of a headphone according to the present modified example. FIG. 20 is a block diagram illustrating an exemplary configuration of an acoustic adjustment system according to the present modified example. Here, an example in which the present modified example is applied to the first embodiment will be described as an example, but the present modified example can be similarly applied to the second embodiment.

Referring to FIG. 19, a headphone 100a according to the present modified example includes a pair of housings 140L and 140R worn on the left and right ears of the user and an arch-like support member 180 that couples the housings 140L and 140R with each other. The headphone 100a is a so-called overhead type headphone. A pair of microphones 110a and 110b are installed on an outer side and an inner sides of each of the housings 140L and 140R. In the present modified example, the voice of the user is collected through the microphones 110a and 110b installed in each of the left and right housings 140L and 140R, and the listening environment characteristic information is acquired based on left and right collection signals. Here, in FIG. 19, for the sake of convenience, different reference numerals are given to distinguish the left and right housings, but each of the housings 140L and 140R has a similar configuration to the housing 140 illustrated in FIG. 1. Thus, a detailed description of the configuration of the housings 140L and 140R will be omitted here.

A configuration of the acoustic adjustment system according to the present modified example will be described with reference to FIG. 20. Referring to FIG. 20, an acoustic adjustment system 70 according to the present modified example includes a left channel sound adjusting unit 10L (a left ch sound adjusting unit 10L), a right channel sound adjusting unit 10R (a right ch sound adjusting unit 10R), and a listening environment characteristic information integrating unit 190. Here, a configuration of each of the left ch sound adjusting unit 10L and the right ch sound adjusting unit 10R is similar to that of the acoustic adjustment system 10 illustrated in FIG. 2 according to the first embodiment. Thus, matters already described in the first embodiment regarding the configurations of the left ch sound adjusting unit 10L and the right ch sound adjusting unit 10R will not be described in detail.

In the present modified example, the listening environment characteristic information acquiring unit 131 of the left ch sound adjusting unit 10L acquires the listening environment characteristic information based on the spoken voice of the user collected by the microphones 110a and 110b of the housing 140L worn the left ear of the user. The listening environment characteristic information acquiring unit 131 of the right ch sound adjusting unit 10R acquires the listening environment characteristic information based on the spoken voice of the user collected by the microphones 110a and 110b of the housing 140R worn the right ear of the user. The microphone 110 illustrated in FIG. 20 corresponds to the microphones 110a and 110b illustrated in FIG. 19 and schematically indicates the microphones 110a and 110b together. In the following description, for the sake of convenience, the listening environment characteristic information acquired by the listening environment characteristic information acquiring unit 131 of the left ch sound adjusting unit 10L is also referred to as "left ch listening environment characteristic information." The listening environment characteristic information acquired by the listening environment characteristic information acquiring unit 131 of the right ch sound adjusting unit 10R is also referred to as "right ch listening environment characteristic information."

In the present modified example, similarly to the first embodiment, the listening environment characteristic information acquired by the listening environment characteristic information acquiring unit 131 may be provided directly to the musical signal processing unit 132, and the musical signal processing unit 132 may appropriately perform the filter process on the musical signal based on the listening environment characteristic information. In this case, the musical signals of the left and right channels are independently corrected based on the listening environment characteristic information acquired by the left and right listening environment characteristic information acquiring units 131.

However, in the present modified example, instead of providing the listening environment characteristic information acquired by the listening environment characteristic information acquiring unit 131 directly to the musical signal processing unit 132, the musical signals of the left and right channels can be corrected using listening environment characteristic information obtained by integrating the left ch listening environment characteristic information and the right ch listening environment characteristic information.

Specifically, in the present modified example, instead of providing the left ch listening environment characteristic information acquired by the listening environment characteristic information acquiring unit 131 of the left ch sound adjusting unit 10L directly to the musical signal processing unit 132, the left ch listening environment characteristic information may be provided to the listening environment characteristic information integrating unit 190. Similarly, the right ch listening environment characteristic information acquired by the listening environment characteristic information acquiring unit 131 of the right ch sound adjusting unit 10R may be provided to the listening environment characteristic information integrating unit 190.

The listening environment characteristic information integrating unit 190 integrates the left ch listening environment characteristic information and the right ch listening environment characteristic information, and calculates the listening environment characteristic information to be finally used for correction of the musical signal. For example, the listening environment characteristic information integrating unit 190 may calculate the integrated listening environment characteristic information by averaging the left ch listening environment characteristic information and the right ch listening environment characteristic information. However, the integration process performed by the listening environment characteristic information integrating unit 190 is not limited to this example. The integration process may be another process of calculating new listening environment characteristic information based on the left ch listening environment characteristic information and the right ch listening environment characteristic information, for example, a process of multiplying each of the left ch listening environment characteristic information and the right ch listening environment characteristic information by a weighting coefficient and adding the resulting information.

The listening environment characteristic information integrating unit 190 provides the calculated listening environment characteristic information to the musical signal processing units 132 of the left ch sound adjusting unit 10L and the right ch sound adjusting unit 10R. Each of the musical signal processing units 132 performs the filter process on the musical signal based on the integrated listening environment characteristic information. As described above, a plurality of pieces of listening environment characteristic information that are independently acquired are integrated, and thus the listening environment characteristic information can be obtained with a higher degree of accuracy. Further, the filter process is performed on the musical signal using the integrated listening environment characteristic information, and thus the filter process in which the characteristic of the listening environment is further reflected can be performed.

Further, when the integrated listening environment characteristic information is calculated based on the left ch listening environment characteristic information and the right ch listening environment characteristic information, the listening environment characteristic information integrating unit 190 may not perform the calculation of the listening environment characteristic information and the provision of the listening environment characteristic information to the musical signal processing unit 132, that is, may not update the parameter for performing filter correction in the musical signal processing unit 132, if the left ch listening environment characteristic information is remarkably different from the right ch listening environment characteristic information. When the left ch listening environment characteristic information is remarkably different from the right ch listening environment characteristic information, at least any one value is considered to be abnormal, and the process of acquiring the listening environment characteristic information by either or both of the left and right listening environment characteristic information acquiring units 131 is considered to be abnormally performed. Thus, as described above, when the left ch listening environment characteristic information is remarkably different from the right ch listening environment characteristic information, the musical signal processing unit 132 does not update the parameter, and thus it is possible to prevent the filter process from being performed based on abnormal listening environment characteristic information. As described above, the listening environment characteristic information integrating unit 190 may determine reliability of the left ch listening environment characteristic information and the right ch listening environment characteristic information that are acquired based on the left ch listening environment characteristic information and the right ch listening environment characteristic information.

The modified example in which listening environment characteristic information is acquired by each of the pair of housings has been described above with reference to FIGS. 19 and 20. As described above, according to the present modified example, the left ch listening environment characteristic information and the right ch listening environment characteristic information are acquired based on the collection signal collected by the microphone 110 installed in each of a pair of housings 140L and 140R. Then, the filter process is performed on the musical signal using the listening environment characteristic information obtained by integrating the left ch listening environment characteristic information and the right ch listening environment characteristic information. Thus, the filter process in which the characteristic of the listening environment is further reflected can be performed.

The function of the listening environment characteristic information integrating unit 190 may be implemented as various kinds of processors such as a CPU or a DSP operating according to a predetermined program. The processor for implementing the function of the listening environment characteristic information integrating unit 190 may be the same as the processor constituting the control unit 130 of either of the left ch sound adjusting unit 10L and the right ch sound adjusting unit 10R, or may be a processor separate from the processor constituting the control unit 130.

5. Hardware Configuration

Figure 21:
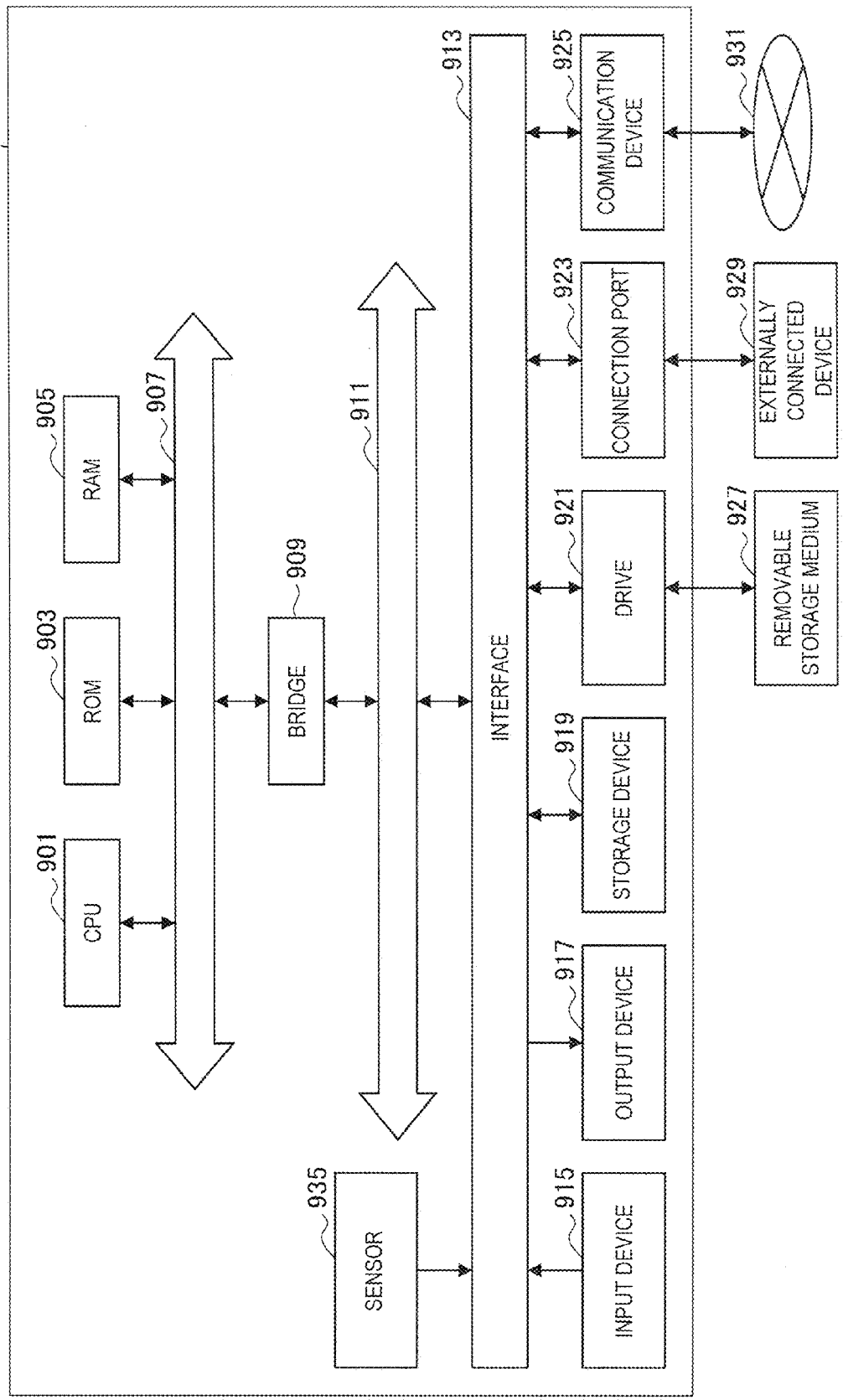
FIG. 21 is a block diagram illustrating an example of a hardware configuration of an information processing device according to the first and second embodiments.

Next, a hardware configuration of the information processing device according to the first and second embodiments will be described with reference to FIG. 21. FIG. 21 is a block diagram illustrating an example of a hardware configuration of the information processing device according to the first and second embodiments. An information processing device 900 illustrated in FIG. 21 can implement an integrated device when the acoustic adjustment systems 10, 20, 30, and 70 illustrated in FIG. 1, FIG. 6, FIG. 16, and FIG. 20, the mobile terminal 50 illustrated in FIG. 18, and the like are implemented as the integrated device. For example, the information processing device 900 illustrated in FIG. 21 can implement a configuration of an information processing device such as a mobile terminal or a server in which the functions of the control units 130, 230, and 330 illustrated in FIG. 1, FIG. 6, FIG. 16, FIG. 18, and FIG. 20 or the listening environment characteristic information integrating unit 190 illustrated in FIG. 20 is mounted.

The information processing device 900 includes a CPU 901, read-only memory (ROM) 903, and random access memory (RAM) 905. The information processing device 900 may also include a host bus 907, a bridge 909, an external bus 911, an interface 913, an input device 915, an output device 917, a storage device 919, a drive 921, a connection port 923, a communication device 925, and a sensor 935. The information processing device 900 may also include a processing circuit called a DSP or an application-specific integrated circuit (ASIC) instead of, or together with, the CPU 901.

The CPU 901 functions as a computational processing device and a control device, and controls all or part of the operation in the information processing device 900 by following various programs recorded in the ROM 903, the RAM 905, the storage device 919, or a removable recording medium 927. The ROM 903 stores information such as programs and computational parameters used by the CPU 901. The RAM 905 temporarily stores information such as programs used during execution by the CPU 901, and parameters that change as appropriate during such execution. The CPU 901, the ROM 903, and the RAM 905 are connected to each other by the host bus 907, which is realized by an internal bus such as a CPU bus. Additionally, the host bus 907 is connected to an external bus 911 such as a Peripheral Component Interconnect/Interface (PCI) bus via the bridge 909. The CPU 901 corresponds to, for example, the control units 130, 230, and 330 illustrated in FIG. 1, FIG. 6, FIG. 16, FIG. 18 and FIG. 20 in the present embodiment. The CPU 901 can constitute the listening environment characteristic information integrating unit 190 illustrated in FIG. 20.

The input device 915 is a device operated by a user, such as a mouse, a keyboard, a touch panel, or one or more buttons, switches, and levers, for example. The input device 915 may also be a remote control device utilizing infrared or some other electromagnetic wave, and may also be an externally connected device 929 such as a mobile phone associated with the operation of the information processing device 900, for example. The input device 915 includes an input control circuit that generates an input signal on the basis of information input by the user, and outputs the generated input signal to the CPU 901. The input device 915 may also be a speech input device such as a microphone. By operating the input device 915, the user inputs various data and instructs the information processing device 900 to perform processing operations, for example. For example, when the acoustic adjustment systems 10, 20, 30, and 70 illustrated in FIG. 1, FIG. 6, FIG. 16, and FIG. 20 are implemented as an integrated device, the input device 915 can correspond to the microphones 110 and 210 in the device.

The output device 917 is realized by a device capable of visually or aurally reporting acquired information to a user. The output device 917 may be a display device such as an LCD, a plasma display panel (PDP), an organic EL display, a lamp, or a light, an audio output device such as one or more speakers and headphones, or another device such as a printer, for example. The output device 917 may output results obtained from processing by the information processing device 900 in the form of visual information such as text or an image, or in the form of audio such as speech or sound. For example, when the acoustic adjustment systems 10, 20, 30, and 70 illustrated in FIG. 1, FIG. 6, FIG. 16, and FIG. 20 are implemented as an integrated device, the audio output device corresponds to the speakers 120, 220a, and 220b in the device.

The storage device 919 is a device used for data storage, realized as an example of storage in the information processing device 900. The storage device 919 may be a magnetic storage device such as a hard disk drive (HDD), a semiconductor storage device, an optical storage device, or a magneto-optical storage device, for example. The storage device 919 stores information such as programs executed by the CPU 901, various data, and various externally acquired data. In the present embodiment, for example, the storage device 919 can store various kinds of information processed by the control units 130, 230, and 330 illustrated in FIG. 1, FIG. 6, FIG. 16, FIG. 18, and FIG. 20 and results of various kinds of processes by the control units 130, 230, and 330. For example, the storage device 919 can store information such as the musical signal input from the external device (the reproduction device), the acquired listening environment characteristic information, and the parameter for correcting the calculated musical signal.

The drive 921 is a reader/writer for a removable recording medium 927 such as a magnetic disk, an optical disc, a magneto-optical disc, or semiconductor memory, and is built into or externally attached to the information processing device 900. The drive 921 retrieves information recorded in an inserted removable recording medium 927, and outputs the retrieved information to the RAM 905. Additionally, the drive 921 writes information to an inserted removable recording medium 927. For example, when the configuration of the acoustic adjustment systems 10, 20, 30, and 70 illustrated in FIG. 1, FIG. 6, FIG. 16, and FIG. 20 and the external device (the reproduction device) are implemented as an integrated device, the drive 921 corresponds to the reproduction device in the device. The drive 921 can read musical content recorded in the removable recording medium 927, reproduce the musical content, and provide the musical signal corresponding to the musical content to the control units 130, 230, and 330 illustrated in FIG. 1, FIG. 6, FIG. 16, FIG. 18, and FIG. 20. For example, the drive 921 can read various kinds of information processed by the control units 130, 230, and 330 and results of various kinds of processes by the control units 130, 230, and 330 from the removable recording medium 927, and write the information and the results in the removable recording medium 927.

The connection port 923 is a port for connecting equipment directly to the information processing device 900. The connection port 923 may be a Universal Serial Bus (USB) port, an IEEE 1394 port, or a Small Computer System Interface (SCSI) port, for example. The connection port 923 may also be an RS-232C port, an optical audio socket, or a High-Definition Multimedia Interface (HDMI™) port. By connecting an externally connected device 929 to the connection port 923, various data may be exchanged between the information processing device 900 and the externally connected device 929. For example, various kinds of information processed by the control units 130, 230, and 330 illustrated in FIG. 1, FIG. 6, FIG. 16, FIG. 18, and FIG. 20 and results of various kinds of processes by the control units 130, 230, and 330 can be transmitted to or received from the externally connected device 929 via the connection port 923.

The communication device 925 is a communication interface realized by a communication device that connects to a communication network 931, for example. The communication device 925 may be a device such as a wired or wireless local area network (LAN), Bluetooth, or Wireless USB (WUSB) communication card, for example. The communication device 925 may also be an optical communication router, an asymmetric digital subscriber line (ADSL) router, or a modem for any of various types of communication. The communication device 925 transmits and receives signals or other information to and from the Internet or another communication device using a given protocol such as TCP/IP, for example. Also, the communication network 931 connected to the communication device 925 is a network connected in a wired or wireless manner, and may be the Internet, a home LAN, infrared communication, radio-wave communication, or satellite communication, for example. For example, the communication device 925 may transmit or receive various kinds of information processed by the control units 130, 230, and 330 illustrated in FIG. 1, FIG. 6, FIG. 16, FIG. 18, and FIG. 20 and results of various kinds of processes by the control units 130, 230, and 330 to or from any other external device via the communication network 931. For example, the communication device 925 corresponds to the communication units 170 and 510 illustrated in FIG. 18.

The sensor 935 is any of various sensors such as an acceleration sensor, a gyro sensor, a geomagnetic sensor, an optical sensor, a sound sensor, or a range finding sensor, for example. The sensor 935 acquires information regarding the state of the information processing device 900 itself, such as the orientation of the case of the information processing device 900, as well as information regarding the environment surrounding the information processing device 900, such as the brightness or noise surrounding the information processing device 900, for example. For example, the sensor 935 corresponds to the position detecting unit 520 illustrated in FIG. 18.

The foregoing thus illustrates an exemplary hardware configuration of the information processing device 900. Each of the above structural elements may be realized using general-purpose members, but may also be realized in hardware specialized in the function of each structural element. Such a configuration may also be modified as appropriate according to the technological level at the time of the implementation.

Note that a computer program for realizing the respective functions of the information processing device 900 as discussed above, particularly, the control units 130, 230, and 330 described above, may be created and implemented in a PC or the like. In addition, a computer-readable recording medium storing such a computer program may also be provided. The recording medium may be a magnetic disc, an optical disc, a magneto-optical disc, or flash memory, for example. Furthermore, the above computer program may also be delivered via a network, for example, without using a recording medium.

6. Conclusion

The first and second embodiments of the present disclosure and several modified examples of the first and second embodiments have been described above. As described above, according to the first and second embodiments, the listening space characteristic information indicating the acoustic characteristic of the listening space is acquired based on the external sound. Then, the acoustic characteristic of the listening space is applied to the musical signal based on the acquired listening space characteristic information. Thus, music having a feeling of more openness that is more harmonious with the external sound can be provided to the user. For example, even when the user uses a sound-isolating headphone having a high sound insulating property, the user can listen to music with a feeling such as background music (BGM) while hearing the external sound.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

For example, the various processes and functions in the first and second embodiments as well as each modification described earlier may also be executed in arbitrary combinations with each other to the extent that such combinations are mutually feasible. By executing the various processes and functions according to each embodiment and each modification in arbitrary combinations, it becomes possible to obtain multiply the advantageous effects obtained by each of the embodiments and each of the modifications.

Additionally, the present technology may also be configured as below.

(1)

An information processing device, including:

a listening environment characteristic information acquiring unit configured to acquire listening environment characteristic information indicating a characteristic of a listening environment based on an external sound collected through at least one microphone; and a musical signal processing unit configured to perform filtering of a musical signal according to a filter characteristic based on the acquired listening environment characteristic information.

(2)

The information processing device according to (1), wherein the external sound is a spoken voice of a user, and the listening environment characteristic information acquiring unit acquires the listening environment characteristic information based on the spoken voice collected through a first microphone via a body of the user and the spoken voice collected through a second microphone different from the first microphone via the listening environment.

(3)

The information processing device according to (2), wherein the listening environment characteristic information is a transfer function until the spoken voice arrives at the second microphone via the listening environment.

(4)

The information processing device according to (1), wherein the external sound is a predetermined measurement sound output from a speaker to the listening environment, and the listening environment characteristic information acquiring unit acquires the listening environment characteristic information based on the measurement sound collected through the microphone.

(5)
The information processing device according to (4), wherein the listening environment characteristic information is a transfer function until the measurement sound arrives at the microphone via the listening environment.

(6)
The information processing device according to (4), wherein the listening environment characteristic information is a correlation function of the measurement sound before output from the speaker and the measurement sound collected through the microphone via the listening environment.

(7)
The information processing device according to (1), wherein the listening environment characteristic information acquiring unit acquires the listening environment characteristic information based on an uncorrelated noise collected through the microphone.

(8)
The information processing device according to (7), wherein the listening environment characteristic information is an auto-correlation function of the uncorrelated noise.

(9)
The information processing device according to any one of (1) to (8), wherein the musical signal processing unit applies at least a reverberation characteristic of the listening environment to the musical signal.

(10)
The information processing device according to (9), wherein the musical signal processing unit applies the reverberation characteristic of the listening environment to the musical signal by performing convolution on the musical signal based on a transfer function of the external sound in the listening environment using a finite impulse response (FIR) filter.

(11)
The information processing device according to any one of (1) to (9), wherein the musical signal processing unit performs the filtering of the musical signal using a parameter indicating an acoustic characteristic of the listening environment calculated based on the listening environment characteristic information.

(12)
The information processing device according to (11), wherein the musical signal processing unit includes an infinite impulse response (IIR) filter in which a parameter indicating the reverberation characteristic of the listening environment is reflected and an equalizer in which a parameter indicating a frequency characteristic of the listening environment is reflected.

(13)
The information processing device according to any one of (1) to (12), wherein the musical signal processing unit adjusts an acoustic pressure ratio of acoustic pressure of a sound related to the musical signal and acoustic pressure of the external sound.

(14)
An information processing method, including:
acquiring, by a processor, listening environment characteristic information indicating a characteristic of a listening environment based on an external sound collected through at least one microphone; and
performing, by the processor, filtering of a musical signal according to a filter characteristic based on the acquired listening environment characteristic information.

(15)
A program causing a processor of a computer to execute:
a function of acquiring listening environment characteristic information indicating a characteristic of a listening environment based on an external sound collected through at least one microphone; and
a function of performing filtering of a musical signal according to a filter characteristic based on the acquired listening environment characteristic information.

REFERENCE SIGNS LIST 10, 20, 30, 40, 70 acoustic adjustment system
50 mobile terminal
60 listening environment characteristic information DB
100, 200 headphone
110, 110a, 110b, 210 microphone
120, 220a, 220b speaker
130, 230, 330 control unit
131, 231 listening environment characteristic information acquiring unit
132, 232, 332 musical signal processing unit
133 monitor signal generating unit
134 noise cancellation signal generating unit
170, 510 communication unit
190 listening environment characteristic information integrating unit
520 position detecting unit

The invention claimed is:

1. An information processing device, comprising:
a listening environment characteristic information acquiring unit configured to acquire listening environment characteristic information indicating a characteristic of a listening environment based on at least one external sound collected through at least one microphone, wherein the at least one external sound includes a spoken voice of a user collected through a first microphone via a body of the user and the spoken voice of the user collected through a second microphone different from the first microphone via the listening environment; and
a musical signal processing unit configured to perform filtering of a musical signal according to a filter characteristic based on the acquired listening environment characteristic information.

2. The information processing device according to claim 1,
wherein the listening environment characteristic information is a transfer function until the spoken voice arrives at the second microphone via the listening environment.

3. The information processing device according to claim 1,
wherein the at least one external sound includes a predetermined measurement sound output from a speaker to the listening environment, and
the listening environment characteristic information acquiring unit is configured to acquire the listening environment characteristic information based on the measurement sound collected through the at least one microphone.

4. The information processing device according to claim 3,
wherein the listening environment characteristic information is a transfer function until the measurement sound arrives at the at least one microphone via the listening environment.

5. The information processing device according to claim 3,
wherein the listening environment characteristic information is a correlation function of the measurement sound before output from the speaker and the measurement sound collected through the at least one microphone via the listening environment.

6. The information processing device according to claim 1,
wherein the listening environment characteristic information acquiring unit is configured to acquire the listening environment characteristic information based on an uncorrelated noise collected through the at least one microphone.

7. The information processing device according to claim 6,
wherein the listening environment characteristic information is an auto-correlation function of the uncorrelated noise.

8. The information processing device according to claim 1,
wherein the musical signal processing unit is configured to apply at least a reverberation characteristic of the listening environment to the musical signal.

9. The information processing device according to claim 8,
wherein the musical signal processing unit is configured to apply the reverberation characteristic of the listening environment to the musical signal by performing convolution on the musical signal based on a transfer function of the at least one external sound in the listening environment using a finite impulse response (FIR) filter.

10. The information processing device according to claim 8,
wherein the musical signal processing unit is configured to perform the filtering of the musical signal using a parameter indicating an acoustic characteristic of the listening environment calculated based on the listening environment characteristic information.

11. The information processing device according to claim 10,
wherein the musical signal processing unit includes an infinite impulse response (IIR) filter in which a parameter indicating the reverberation characteristic of the listening environment is reflected and an equalizer in which a parameter indicating a frequency characteristic of the listening environment is reflected.

12. The information processing device according to claim 1,
wherein the musical signal processing unit is configured to adjust an acoustic pressure ratio of acoustic pressure of a sound related to the musical signal and acoustic pressure of the at least one external sound.

13. An information processing method, comprising:
acquiring, by a processor, listening environment characteristic information indicating a characteristic of a listening environment based on at least one external sound collected through at least one microphone, wherein the at least one external sound includes a spoken voice of a user collected through a first microphone via a body of the user and the spoken voice of the user collected through a second microphone different from the first microphone via the listening environment; and
performing, by the processor, filtering of a musical signal according to a filter characteristic based on the acquired listening environment characteristic information.

14. A non-transitory computer-readable recordable medium encoded with a plurality of instructions that, when executed by a processor of a computer, perform:
acquiring listening environment characteristic information indicating a characteristic of a listening environment based on at least one external sound collected through at least one microphone, wherein the at least one external sound includes a spoken voice of a user collected through a first microphone via a body of the user and the spoken voice of the user collected through a second microphone different from the first microphone via the listening environment; and
filtering of a musical signal according to a filter characteristic based on the acquired listening environment characteristic information.

* * * * *